US012438656B2

(12) United States Patent
Yan et al.

(10) Patent No.: US 12,438,656 B2
(45) Date of Patent: Oct. 7, 2025

(54) RESOURCE CONFIGURATION METHOD AND APPARATUS

(71) Applicant: Huawei Technologies Co., Ltd., Shenzhen (CN)

(72) Inventors: Mao Yan, Chengdu (CN); Rong Wen, Shenzhen (CN); Lei Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 322 days.

(21) Appl. No.: 17/675,676

(22) Filed: Feb. 18, 2022

(65) Prior Publication Data

US 2022/0256615 A1    Aug. 11, 2022

Related U.S. Application Data

(63) Continuation of application No. 16/674,591, filed on Nov. 5, 2019, now Pat. No. 11,291,054, which is a (Continued)

(30) Foreign Application Priority Data

May 5, 2017   (CN) .......................... 201710313436.X

(51) Int. Cl.
*H04W 4/00*         (2018.01)
*H04L 5/00*         (2006.01)
(Continued)

(52) U.S. Cl.
CPC ....... *H04W 74/0833* (2013.01); *H04L 5/0007* (2013.01); *H04L 5/0082* (2013.01); *H04W 56/0045* (2013.01); *H04W 72/046* (2013.01)

(58) Field of Classification Search
CPC ......... H04W 74/0833; H04W 56/0045; H04W 72/046; H04W 74/006; H04W 74/002;
(Continued)

(56) References Cited

U.S. PATENT DOCUMENTS

2012/0002617 A1   1/2012 Vujcic
2013/0028204 A1   1/2013 Dinan
(Continued)

FOREIGN PATENT DOCUMENTS

AU    2018366785 B2 *  8/2021  ........... H04L 5/0007
CA       3033386 A1 *  2/2018  ........... H04L 5/0032
(Continued)

OTHER PUBLICATIONS

3GPP TSG RAN WG1, R1-1700891, "NR 4-step random access procedure", Samsung, Jan. 16-20, 2017, 14 pages, Spokane, Washington, USA.
(Continued)

*Primary Examiner* — Thai Dinh Hoang
(74) *Attorney, Agent, or Firm* — Slater Matsil, LLP

(57) ABSTRACT

This application discloses a resource configuration method and an apparatus. The method includes: obtaining, by a terminal device, configuration information, where the configuration information includes at least one piece of the following information: random access resource configuration information and downlink signal parameter information; and accessing, by the terminal device, a network device based on the configuration information. A corresponding apparatus is also disclosed.

31 Claims, 18 Drawing Sheets

Related U.S. Application Data continuation of application No. PCT/CN2018/085738, filed on May 4, 2018.

(51) Int. Cl.
   *H04W 56/00*     (2009.01)
   *H04W 72/044*    (2023.01)
   *H04W 74/0833*   (2024.01)

(58) Field of Classification Search
   CPC ... H04L 5/0007; H04L 5/0082; H04L 5/0048; H04L 5/005; H04L 5/0053; H04L 47/726; H04L 47/824
   See application file for complete search history.

(56) References Cited

U.S. PATENT DOCUMENTS

| | | | |
|---|---|---|---|
| 2014/0247759 A1 | 9/2014 | Zhang et al. | |
| 2015/0049652 A1 | 2/2015 | Li et al. | |
| 2016/0080969 A1* | 3/2016 | Tseng | H04W 4/70 370/329 |
| 2016/0081108 A1* | 3/2016 | Tseng | H04W 72/569 370/329 |
| 2016/0135147 A1 | 5/2016 | Ouchi et al. | |
| 2016/0183225 A1 | 6/2016 | Ahn et al. | |
| 2016/0360544 A1* | 12/2016 | Yang | H04L 5/00 |
| 2017/0111933 A1 | 4/2017 | Wu | |
| 2017/0202053 A1 | 7/2017 | Rune | |
| 2017/0231011 A1 | 8/2017 | Park et al. | |
| 2018/0070380 A1 | 3/2018 | Nagaraja et al. | |
| 2018/0124837 A1 | 5/2018 | Yu et al. | |
| 2018/0324716 A1 | 11/2018 | Jeon et al. | |
| 2019/0029050 A1 | 1/2019 | Li et al. | |
| 2020/0045746 A1 | 2/2020 | Zhang et al. | |
| 2020/0229234 A1 | 7/2020 | Hao et al. | |
| 2020/0267762 A1* | 8/2020 | Lee | H04W 76/27 |
| 2020/0351022 A1* | 11/2020 | Choe | H04L 1/1664 |
| 2022/0061125 A1* | 2/2022 | Lee | H04W 76/18 |
| 2022/0116952 A1* | 4/2022 | Lee | H04L 5/0053 |
| 2022/0159692 A1* | 5/2022 | Lee | H04L 5/0053 |
| 2022/0248410 A1* | 8/2022 | Lee | H04W 52/32 |
| 2022/0361063 A1* | 11/2022 | Jo | H04W 36/36 |
| 2023/0254844 A1* | 8/2023 | Lee | H04L 5/1469 370/329 |
| 2023/0268981 A1* | 8/2023 | Park | H04L 5/0051 370/316 |
| 2024/0008089 A1* | 1/2024 | Yi | H04W 80/02 |
| 2024/0129954 A1* | 4/2024 | Yi | H04W 74/0833 |

FOREIGN PATENT DOCUMENTS

| | | | | |
|---|---|---|---|---|
| CN | 102215598 A | 10/2011 | | |
| CN | 105165099 A | 12/2015 | | |
| CN | 105682232 A | 6/2016 | | |
| CN | 107734632 A | 2/2018 | | |
| CN | 108260223 A | 7/2018 | | |
| EP | 3131343 A1 | 2/2017 | | |
| WO | 2007052971 A1 | 5/2007 | | |
| WO | WO-2014130156 A1 * | 8/2014 | ......... | H04L 12/4633 |
| WO | 2016086144 A1 | 6/2016 | | |
| WO | 2016195346 A1 | 12/2016 | | |
| WO | 2017046672 A1 | 3/2017 | | |
| WO | 2016025899 A8 | 5/2017 | | |
| WO | WO-2021030804 A1 * | 2/2021 | ........... | H04L 1/1671 |

OTHER PUBLICATIONS

3GPP TS 36.211 V14.2.0 (Mar. 2017); 3rd Generation Partnership Project; Technical Specification Group Radio Access Network; Evolved Universal Terrestrial Radio Access (E-UTRA); Physical channels and modulation (Release 14); 197 pages.

3GPP TS 38.321 V0.0.3 (May 2017), 3rd Generation Partnership Project; Technical Specification Group Radio Access Network; NR;Medium Access Control (MAC) protocol specification (Release 15), 20 pages.

3GPP TS 38.331 V0.0.2 (Mar. 2017), 3rd Generation Partnership Project; Technical Specification Group Radio Access Network; NR;Radio Resource Control (RRC); Protocol specification (Release 15), 13 pages.

Huawei, HiSilicon, 3GPP TSG RAN WG1 Meeting #88bis, R1-1704188, :"RACH Procedures and Resource Configuration", Apr. 3-7, 2017, 8 pages, Spokane, USA.

Cohere Technologies, "SS Block Compostition, SS Burst Set Composition and SS Time Index Indication", 3GPP TSG-RAN Meeting #88bis, R1-1705459, Apr. 3-7, 2017, 3 pages, Spokane, USA.

Intel Corporation; "NR random access procedure", 3GPP TSG RAN WG1 #88bis, R1-1706172, Apr. 3-7, 2017, 8 pages, Spokane, USA.

Mitsubishi Electric, "WF on Power Ramping Counter of RACH Msg. 1 Retransmission", 3GPP TSG RAN WG1 Meeting #88bis, R1-1706613, Apr. 3-7, 2017, 8 pages, Spokane, USA.

Nokia et al., WF on RACH Configuration Index:, 3GPP TSG RAN WG1 Meeting #88bis, R1-1706849, Apr. 3-7, 2017, 3 pages, Spokane, USA.

Nokia, Alcatel-Lucent Shanghai Bell; "NR Physical Random Access Channel", 3GPP TSG-RAN WG1 #88bis, R1-174942, Apr. 3-7, 2017, 41 pages, Spokane, USA.

* cited by examiner

Table 1 Example 1 of the random access configuration information

| PRACH configuration index | Preamble format | System frame number | Subframe number | Quantity of contiguous subframes | Slot number | Quantity of contiguous slots | Random access resource index | Quantity of downlink data symbols |
|---|---|---|---|---|---|---|---|---|
| 0 to N, where N is an integer | 0 to N, where N is an integer | Mod(SFN, N)=k, where k=0, 1, ..., N-1, and when N is 1, all system frames are indicated | 0 to 9 | 1 to 4 | 1 to 64 | 1 to 64 | Mod(RO, N)=k, where k=0, 1, ..., N-1, and RO is a random access resource index; and when N is 1, all random access resources are indicated | 0 to 13 |
| Amount of uplink data | Quantity of random access resources | Frequency quantity | Frequency start location | Frequency offset | Timing advance | Random access preamble grouping information | Subcarrier spacing | |
| 0 to 13 | 1 to 64 | 1 to 64 | 0 to N-6, where N is a maximum quantity of uplink resource blocks | 0 to N-6, where N is a maximum quantity of uplink resource blocks | 0 | 1 to N, where N is a quantity of random access preambles, for example, N is 64 | 0 to N-1, where N is a quantity of supported subcarrier configurations, for example, when N=0, it indicates that the subcarrier spacing is 15 kHz, and when N=1, it indicates that the subcarrier spacing is 30 kHz | |

Fig. 16A

Table 2 Example 2 of the random access configuration information

| PRACH configuration index | Preamble format | System frame number | Subframe number | Quantity of contiguous slots | OFDM symbol | Quantity of contiguous OFDM symbols | Random access resource index | Quantity of downlink data symbols |
|---|---|---|---|---|---|---|---|---|
| 0 to N, where N is an integer | 0 to N, where N is an integer | Mod(SFN, N)=k, where k=0, 1, ..., N-1; and when N is 1, all system frames are indicated | 0 to 9 | 1 to 64 | 0 to 13 | 0 to 13 | Mod(RO, M)=k, where k=0, 1, ..., N-1, and RO is a random access resource index; and when N is 1, all random access resources are indicated | 0 to 13 |
| Amount of uplink data | Quantity of random access resources | Frequency quantity | Frequency start location | Frequency offset | Timing advance | Random access preamble grouping information | Subcarrier spacing | |
| 0 to 13 | 1 to 64 | 1 to 64 | 0 to N-6, where N is a maximum quantity of uplink resource blocks | 0 to N-6, where N is a maximum quantity of uplink resource blocks | 0 | 1 to N, where N is a quantity of random access preambles, for example, N is 64 | 0 to N-1, where N is a quantity of supported subcarrier configurations, for example, when N=0, it indicates that the subcarrier spacing is 15 kHz; and when N=1, it indicates that the subcarrier spacing is 30 kHz | |

Fig. 16B

Table a Example a of the random access configuration information

| PRACH configuration index | Preamble format | System frame number | Subframe number | Quantity of contiguous OFDM symbols | Random access resource index | | Quantity of downlink data symbols |
|---|---|---|---|---|---|---|---|
| 0 to N, where N is an integer | 0 to N, where N is an integer | Mod(SFN, N)=k, where k=0,1,...,N-1, and when N is 1, all system frames are indicated | 0 to 9 | 0 to 13 | Mod(RO, N)=k, where k=0, 1, ..., N-1, and RO is a random access resource index; and when N is 1, all random access resources are indicated | NA | 0 to 13 |
| Amount of uplink data | Quantity of random access resources | Frequency quantity | Frequency start location | Frequency offset | Timing advance | Random access preamble grouping information | Subcarrier spacing |
| 0 to 13 | 1 to 64 | 1 to 64 | 0 to N-6, where N is a maximum quantity of uplink resource blocks | 0 to N-6, where N is a maximum quantity of uplink resource blocks | 0 | 1 to N, where N is a quantity of random access preambles, for example, N is 64 | 0 to N-1, where N is a quantity of supported subcarrier configurations, for example, when N=0, it indicates that the subcarrier spacing is 15 kHz, and when N=1, it indicates that the subcarrier spacing is 30 kHz |

Fig. 16C

RESOURCE CONFIGURATION METHOD AND APPARATUS

CROSS-REFERENCE TO RELATED APPLICATIONS

This application is a continuation of U.S. application Ser. No. 16/674,591, filed on Nov. 5, 2019, which is a continuation of International Application No. PCT/CN2018/085738, filed on May 4, 2018, which claims priority of Chinese Patent Application No. 201710313436.X, filed on May 5, 2017. All of the afore-mentioned patent applications are hereby incorporated by reference in their entireties.

TECHNICAL FIELD

The present disclosure relates to the field of communications technologies, and in particular, to a resource configuration method and an apparatus.

BACKGROUND

In a multi-beam network, downlink synchronization and uplink synchronization need to be performed before a network device and a terminal device communicate with each other. During downlink synchronization, the network device sends a downlink synchronization signal using a plurality of transmit beams, and the terminal device receives and detects the downlink synchronization signal using one or more receive beams, to obtain an optimum downlink transmit beam and receive beam pair, a time, and system information. Uplink synchronization is implemented by using a random access process. The terminal device first sends a random access signal. Then the network device detects the random access signal to obtain an optimum uplink transmit beam and receive beam pair, an uplink time, and the like. Finally, uplink synchronization between the network device and the terminal device is implemented.

In a long term evolution (LTE) communications system, a network device uses a same beam to perform sending and receiving with a terminal device within a coverage area of the network device. However, a random access resource configuration method for LTE is inapplicable to the multi-beam network.

Therefore, a resource configuration problem in the multi-beam network needs to be resolved urgently.

SUMMARY

This application provides a resource configuration method and an apparatus, to implement resource configuration in a multi-beam network.

According to one aspect of this application, a resource configuration method is provided. The method includes: obtaining, by a terminal device, configuration information, where the configuration information includes at least one piece of the following information: random access configuration information and downlink signal parameter information; and accessing, by the terminal device, a network device based on the configuration information.

In this implementation, the terminal device obtains the random access configuration information and/or the downlink signal parameter information, and may access a network based on the configuration information. In this way, a simple resource configuration solution is provided for a multi-beam network, thereby implementing random access associated with a downlink signal in the multi-beam network.

In an implementation, the accessing, by the terminal device, a network device based on the configuration information specifically includes: determining, by the terminal device based on the configuration information, a random access resource and a random access preamble that are associated with a downlink signal; and sending, by the terminal device, the random access preamble to the network device on the random access resource.

In this implementation, the terminal device determines, based on the random access configuration information and/or the downlink signal parameter information, the random access resource and the random access preamble that are associated with the downlink signal, thereby implementing random access associated with a downlink signal in the multi-beam network.

In another implementation, the method further includes: receiving, by the terminal device, at least one piece of the following information from the network device: an index of the random access preamble, an index of the downlink signal, random access resources associated with downlink signals in a downlink signal burst set, a random access time period, and a total quantity of random access resources associated with downlink signals in a downlink signal burst set.

In this implementation, in a non-contention based access mode, the network device can designate a configuration of random access associated with a downlink signal.

In still another implementation, a transmit power for sending the random access preamble by the terminal device is related to at least one of the following parameters: a maximum quantity of tried beams, a quantity of times of sending the random access preamble by the terminal device, and a maximum quantity of transmissions allowable within a time of random access resources associated with a downlink signal burst set, where the quantity of times of sending the random access preamble is less than or equal to a maximum quantity of preamble transmissions.

In this implementation, the transmit power for sending the random access preamble by the terminal device can be determined based on the foregoing parameters, so that the transmit power for sending the random access preamble matches the maximum quantity of tried beams, the quantity of times of sending the preamble, and the maximum quantity of transmissions allowable within the time of the random access resources associated with the downlink signal burst set.

According to another aspect of this application, a resource configuration method is provided. The method includes: sending, by a network device, configuration information to a terminal device, where the configuration information includes at least one piece of the following information: random access configuration information and downlink signal parameter information; and receiving, by the network device, an access request of the terminal device.

In this implementation, the network device sends the random access configuration information and/or the downlink signal parameter information to the terminal device, and the terminal device may access a network based on the configuration information. In this way, a simple resource configuration solution is provided for a multi-beam network, thereby implementing random access associated with a downlink signal in the multi-beam network.

In an implementation, the receiving, by the network device, an access request of the terminal device specifically includes: receiving, by the network device, a random access preamble that is sent by the terminal device on a random access resource associated with a downlink signal.

In this implementation, the terminal device determines, based on the random access configuration information and/or the downlink signal parameter information, the random access resource and the random access preamble that are associated with the downlink signal; and the network device receives the random access preamble, thereby implementing random access associated with a downlink signal in the multi-beam network.

With reference to the one aspect and the another aspect of this application, in an implementation, the random access configuration information includes a start time, duration, and an end time of random access, where the time is at least one of the following: a subframe, a slot, a mini-slot, an orthogonal frequency division multiplexing OFDM symbol, and a random access resource index.

In this implementation, a random access configuration includes a time configuration and a frequency configuration of a random access resource, and the random access resource is associated with a downlink signal in terms of time and frequency.

With reference to the one aspect and the another aspect of this application, in another implementation, the downlink signal parameter information includes at least one piece of the following information: a quantity of downlink signal bursts in a downlink signal burst set and a quantity of downlink signals in each downlink signal burst.

In this implementation, the downlink signal burst set may include one or more downlink signal bursts, and each downlink signal burst may further include one or more downlink signals. Configuring this information, in combination with the random access configuration information. Each random access resource can be associated with each downlink signal with reference to the random access configuration information by configuring the information. Herein, the information is configured in the downlink signal parameter information.

With reference to the one aspect and the another aspect of this application, in still another implementation, the random access configuration information further includes at least one piece of the following information: an association relationship between downlink signals and random access resources, and a quantity of random access resources associated with each downlink signal burst.

In this implementation, the downlink signal burst set may include one or more downlink signal bursts, and each downlink signal burst may further include one or more downlink signals. Each random access resource can be associated with each downlink signal with reference to the random access configuration information by configuring the information. Herein, the information is configured in the random access configuration information.

With reference to the one aspect and the another aspect of this application, in still another implementation, the configuration information further includes at least one piece of the following information: an association relationship between downlink signals and random access resources, and a quantity of random access resources associated with each downlink signal burst.

In this implementation, the downlink signal burst set may include one or more downlink signal bursts, and each downlink signal burst may further include one or more downlink signals. Each random access resource can be associated with each downlink signal with reference to the random access configuration information by configuring the information. Herein, the information is configured in the configuration information.

With reference to the one aspect and the another aspect of this application, in still another implementation, the downlink signal parameter information further includes at least one piece of the following information: an association relationship between downlink signals and random access resources, and a quantity of random access resources associated with each downlink signal burst.

In this implementation, the association relationship between downlink signals and random access resources, and the quantity of random access resources associated with each downlink signal burst can be configured. Each random access resource can be associated with each downlink signal based on the association relationship between downlink signals and random access resources, and the quantity of random access resources associated with each downlink signal burst.

With reference to the one aspect and the another aspect of this application, in still another implementation, the association relationship between downlink signals and random access resources is determined based on at least one of the following parameters: downlink signal indexes, random access resource indexes, the quantity of downlink signals in each downlink signal burst, and the quantity of random access resources associated with each downlink signal burst.

In this implementation, the association relationship between downlink signals and random access resources can be determined by using these parameters, so that each random access resource can be associated with each downlink signal.

With reference to the one aspect and the another aspect of this application, in still another implementation, the association relationship between downlink signals and random access resources includes an association relationship between an index of each downlink signal and an index of each random access resource.

In this implementation, the association relationship between downlink signals and random access resources can be determined based on the association relationship between indexes of the downlink signals and indexes of the random access resources, so that each random access resource can be associated with each downlink signal.

With reference to the one aspect and the another aspect of this application, in still another implementation, the association relationship between downlink signals and random access resources is determined based on the following parameters: offsets of indexes of the random access resources associated with each downlink signal burst, and the quantity of random access resources associated with each downlink signal burst.

In this implementation, the association relationship between downlink signals and random access resources can be determined by using these parameters, so that each random access resource can be associated with each downlink signal.

With reference to the one aspect and the another aspect of this application, in still another implementation, the downlink signal parameter information includes at least one piece of the following information: a total quantity of random access resources associated with the downlink signal burst set, downlink signal indexes, indexes of random access resources associated with downlink signals, and a quantity of random access resources associated with downlink signals.

In this implementation, each random access resource can be associated with each downlink signal with reference to the random access configuration information by configuring the information. Herein, the information is configured in the downlink signal parameter information.

With reference to the one aspect and the another aspect of this application, in still another implementation, the downlink signal is a synchronization signal block SS block.

According to still another aspect of this application, a terminal device is provided. The terminal device has a function of implementing actions of the terminal device in the foregoing method. The function may be implemented by hardware or by hardware executing corresponding software. The hardware or the software includes one or more modules corresponding to the function.

In a possible implementation, the terminal device includes: an obtaining unit, configured to obtain configuration information, where the configuration information includes at least one piece of the following information: random access configuration information and downlink signal parameter information; and an access unit, configured to access a network device based on the configuration information.

In another possible implementation, the terminal device includes a receiver, a transmitter, a memory, and a processor. The memory stores a set of program code, and the processor is configured to invoke the program code stored in the memory, to perform the following operations: obtaining configuration information, where the configuration information includes at least one piece of the following information: random access configuration information and downlink signal parameter information; and accessing a network device based on the configuration information.

Based on a same inventive concept, for a problem-resolving principle and beneficial effects of the apparatus, refer to the possible method implementations of the terminal device and the brought beneficial effects. Therefore, for implementation of the apparatus, refer to the implementation of the method. Repeated descriptions are not described again.

According to still another aspect of this application, a network device is provided. The network device has a function of implementing actions of the network device in the foregoing methods. The function may be implemented by hardware or by hardware executing corresponding software. The hardware or the software includes one or more modules corresponding to the function.

In a possible implementation, the network device includes: a sending unit, configured to send configuration information to a terminal device, where the configuration information includes at least one piece of the following information: random access configuration information and downlink signal parameter information; and a receiving unit, configured to receive an access request of the terminal device.

In another possible implementation, the network device includes a receiver, a transmitter, a memory, and a processor. The memory stores a set of program code, and the processor is configured to invoke the program code stored in the memory, to perform the following operations: sending configuration information to a terminal device by using the transmitter, where the configuration information includes at least one piece of the following information: random access configuration information and downlink signal parameter information; and receiving an access request of the terminal device by using the receiver.

Based on a same inventive concept, for a problem-resolving principle and beneficial effects of the apparatus, refer to the possible method implementations of the network device and the brought beneficial effects. Therefore, for implementation of the apparatus, refer to the implementation of the method. Repeated descriptions are not described again.

Still another aspect of this application provides a computer-readable storage medium, where the computer-readable storage medium stores an instruction, and when the instruction is run on a computer, the computer is enabled to perform the methods in the foregoing aspects.

According to still another aspect of this application, a communications chip is provided, and the communications chip stores an instruction. When the instruction is run on a communications device, a computer is enabled to perform the methods in the foregoing aspects.

According to still another aspect of this application, a computer program product including an instruction is provided. When the computer program product is run on a computer, the computer is enabled to perform the methods in the foregoing aspects.

BRIEF DESCRIPTION OF THE DRAWINGS

To describe the technical solutions in the embodiments of the present invention more clearly, the following briefly describes the accompanying drawings required for describing the embodiments of the present invention.

FIGS. 16A, 16B, and 16C are tables of random access configuration information according to embodiments of the present invention.

DETAILED DESCRIPTION OF ILLUSTRATIVE EMBODIMENTS

The following describes the embodiments of the present invention with reference to the accompanying drawings in the embodiments of the present invention.

Figure 1:
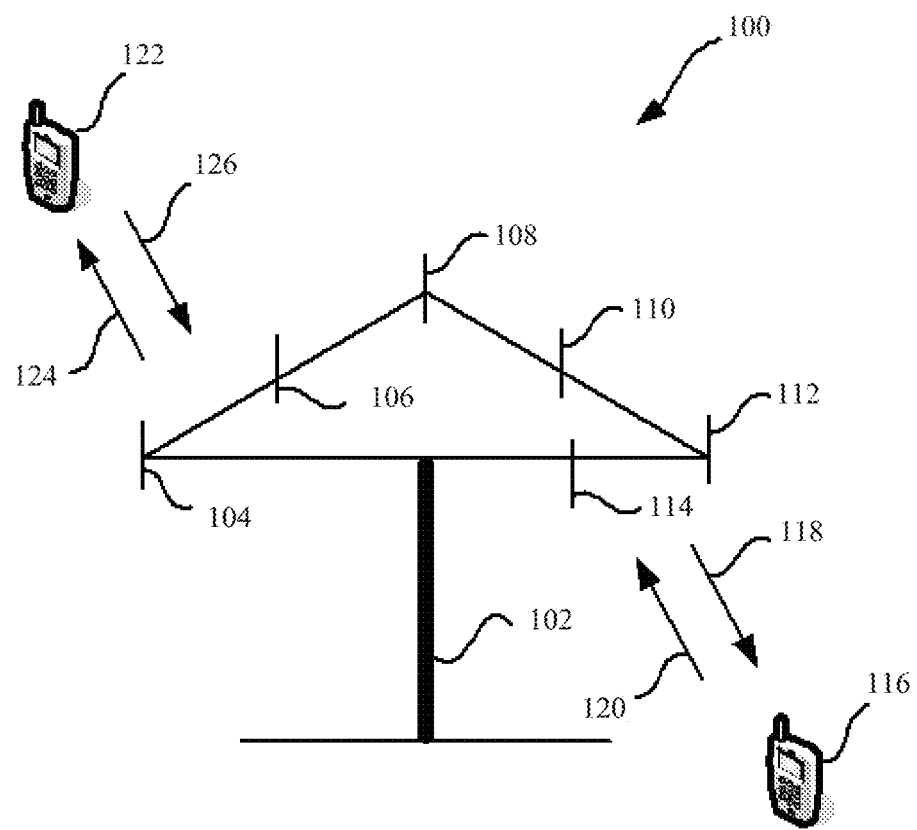
FIG. 1 is a schematic architectural diagram of a communications system according to an embodiment of the present invention.

FIG. 1 is a schematic architectural diagram of a communications system according to an embodiment of the present invention. The communications system includes a base station and a terminal device. The communications system may be a global system for mobile communications (GSM), a code division multiple access (CDMA) system, a wideband code division multiple access (WCDMA) system, a worldwide interoperability for microwave access (WiMAX) system, a long term evolution (LTE) system, a 5G communications system (for example, a new radio (NR) system, a communications system integrating a plurality of communications technologies (for example, a communications system integrating an LTE technology and an NR technology), or a subsequent evolved communications system.

A terminal device in this application is a device with a wireless communication function, and may be a handheld device, an in-vehicle device, a wearable device, or a computing device with a wireless communication function, or another processing device connected to a wireless modem. In different networks, the terminal device may have different names. For example, the terminal device may be user equipment (UE), an access terminal, a subscriber unit, a subscriber station, a mobile station, a mobile console, a remote station, a remote terminal, a mobile device, a user terminal, a terminal, a wireless communications device, a user agent or a user apparatus, a cellular phone, a cordless phone, a session initiation protocol (SIP) phone, a wireless local loop (WLL) station, a personal digital assistant (PDA), or a terminal device in a 5G network or a future evolved network.

A network device in this application is a device deployed in a wireless access network to provide a wireless communications function. The network device includes but is not limited to a base station (for example, a BTS, a NodeB (NB), an evolved NodeB (eNB or eNodeB), a transmission reception point or transmission point (TRP or TP) or a next generation NodeB (gNB) in an NR system, or a base station or a network device in a future communications network), a relay node, an access point, an in-vehicle device, a wearable device, a wireless fidelity (Wi-Fi) station, a wireless backhaul node, a small cell, or a micro base station.

Specifically, in FIG. 1, a base station 102 may include a plurality of antenna groups. Each antenna group may include one or more antennas. For example, one antenna group may include an antenna 104 and an antenna 106, and another antenna group may include an antenna 108 and an antenna 110. In addition, an additional group may be further included, and the additional group may include an antenna 112 and an antenna 114. In high-frequency communication, different antenna groups may be combined to form different antenna panels (panel). For example, one of the antenna groups forms one beam pointing to one direction; and another antenna group forms another beam pointing to another direction. However, to match different device capabilities, more antennas may be required. Therefore, different quantities of antennas may be configured for the additional group according to different device capabilities. For example, in FIG. 1, two antennas are shown for each antenna group. However, more or fewer antennas may be used for each group. The base station 102 may additionally include a transmitter chain and a receiver chain. A person of ordinary skill in the art may understand that both the transmitter chain and the receiver chain may include a plurality of components related to signal sending and receiving, for example, a processor, a modulator, a multiplexer, a demodulator, a demultiplexer, or an antenna.

The base station 102 may communicate with one or more terminal devices, for example, communicating with a terminal device 116 and a terminal device 122. However, it may be understood that the base station 102 may communicate with any quantity of terminal devices similar to the terminal device 116 or 122. As shown in FIG. 1, the terminal device 116 communicates with the antenna 112 and the antenna 114. The antenna 112 and the antenna 114 send information to the terminal device 116 through a forward link 118, and receive information from the terminal device 116 through a reverse link 120. In addition, the terminal device 122 communicates with the antenna 104 and the antenna 106. The antenna 104 and the antenna 106 send information to the terminal device 122 through a forward link 124, and receive information from the terminal device 122 through a reverse link 126. In a frequency division duplex (FDD) system, for example, a frequency band different from that used for the reverse link 120 may be used for the forward link 118, and a frequency band different from that used for the reverse link 126 may be used for the forward link 124. In addition, in a time division duplex (TDD) system, the forward link 118 and the reverse link 120 may share a frequency band, and the forward link 124 and the reverse link 126 may share a frequency band.

An area covered by each group of antennas designed for communication and/or an area covered by transmission of each group of antennas are/is referred to as a sector of the base station 102. For example, an antenna group may be designed to communicate with a terminal device in a sector of an area covered by the base station 102. In a process in which the base station 102 respectively communicates with the terminal device 116 and the terminal device 122 through the forward link 118 and the forward link 124, signal-to-noise ratios of the forward link 118 and the forward link 124 may be increased through beamforming on transmit antennas of the base station 102. In addition, compared with a manner in which the base station sends, through a single antenna, signals to all terminal devices connected to the base station, when the base station 102 sends, through beamforming, signals to the terminal device 116 and the terminal device 122 that are randomly dispersed in a related coverage area, less interference is caused to a mobile node in a neighboring cell.

Within a given time, the base station 102, and the terminal device 116 or the terminal device 122 each may be a wireless communications sending apparatus and/or a wireless communications receiving apparatus. When sending data, the wireless communication sending apparatus may encode the data for transmission. Specifically, the wireless communication sending apparatus may obtain (for example, generating, receiving from another communications apparatus, or storing in a memory), a specific quantity of data bits that are to be sent to the wireless communication receiving apparatus through a channel. Such data bits may be included in a transport block or a plurality of transport blocks of the data, and the transport block may be segmented to generate a plurality of code blocks.

Figure 2A:
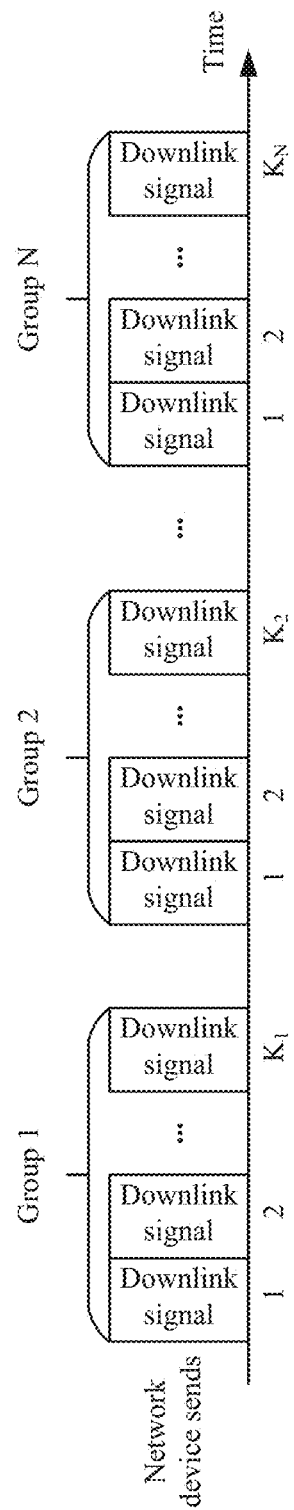
FIG. 2*a* is a schematic diagram of grouping of downlink signals sent by a network device.
Figure 2B:
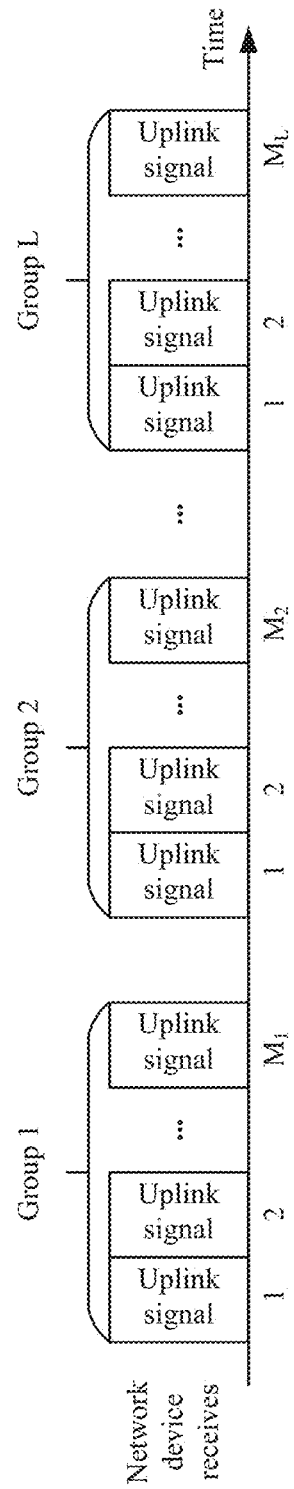
FIG. 2*b* is a schematic diagram of grouping of uplink signals received by a network device.

In a next generation mobile communications system, for example, a new radio (NR) communications system, according to a schematic diagram of grouping of downlink signals sent by a network device shown in FIG. 2a, the network device uses a plurality of transmit beams to implement full coverage of downlink data transmission. According to a schematic diagram of grouping of uplink signals received by a network device shown in FIG. 2b, the network device uses a plurality of receive beams to implement full coverage of uplink data transmission. In a specific example, an uplink/downlink signal may be a synchronization signal block (SS block). One downlink signal corresponds to one transmit beam. The network device associates each downlink signal with an independent random access resource and an independent random access preamble. When receiving a random access preamble associated with a downlink signal k, the network device sends a random access response using a transmit beam corresponding to the downlink signal k. As shown in FIG. 2a and FIG. 2b, a plurality of uplink/downlink signals form one uplink/downlink signal group, or referred to as an uplink/downlink signal burst (in a specific example, the uplink/downlink signal burst may be an SS burst). A plurality of uplink/downlink signal groups implementing full coverage are referred to as one uplink/downlink signal burst set (in a specific example, the uplink/downlink signal burst set may be an SS burst set).

Figure 3:
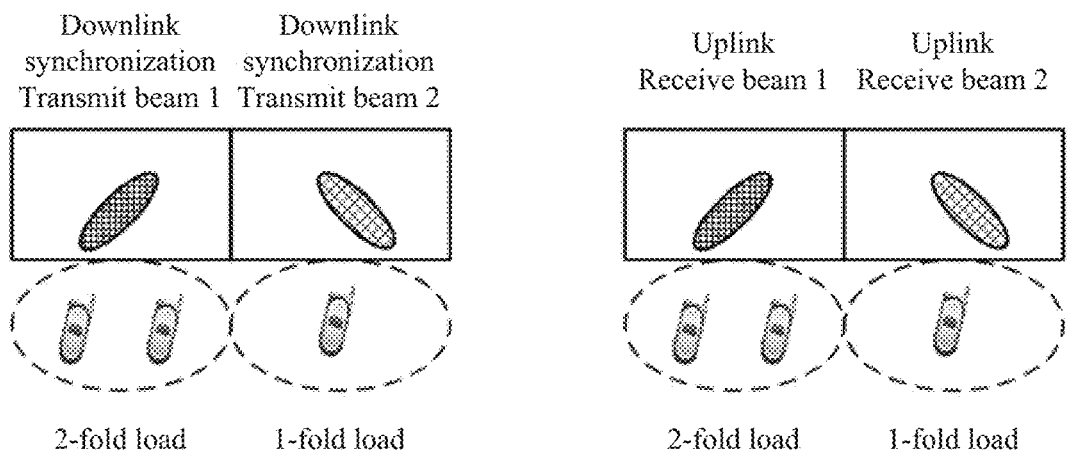
FIG. 3 is a schematic diagram of loads on different transmit beams and different receive beams.
Figure 4:
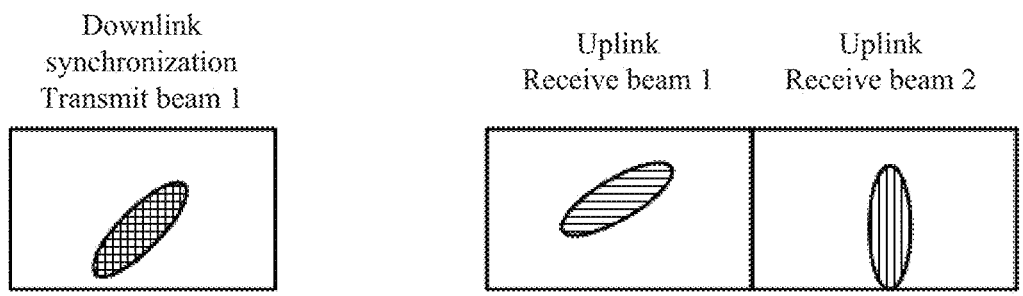
FIG. 4 is a schematic diagram of a transmit beam and a receive beam corresponding to each other.

However, in the current system, how to associate a downlink signal with a random access resource is not discussed. In addition, a plurality of beams are scanned separately in terms of time, and therefore corresponding random access resources need to be configured for different beams. FIG. 3 is a schematic diagram of loads on different transmit beams and different receive beams. There are a larger quantity of users on some beams (for example, a transmit beam 1 and a receive beam 1 in FIG. 3), and there are a smaller quantity of users on some beams (for example, a transmit beam 2 and a receive beam 2 in FIG. 3). Therefore, different quantities of random access resources need to be associated with different loads on the beams. In a schematic diagram of a transmit beam and a receive beam corresponding to each other shown in FIG. 4, transmit beams and receive beams of the network device do not exactly correspond to each other. To be specific, a coverage area of one transmit beam of the network device may be covered by a plurality of receive beams. Therefore, flexible resource configuration is required to efficiently support random access. The embodiments of the present invention provide a specific solution.

The embodiments of the present invention provide a resource configuration method and an apparatus, to provide a simple resource configuration solution for a multi-beam network, thereby implementing random access associated with a downlink signal in the multi-beam network.

Figure 5:
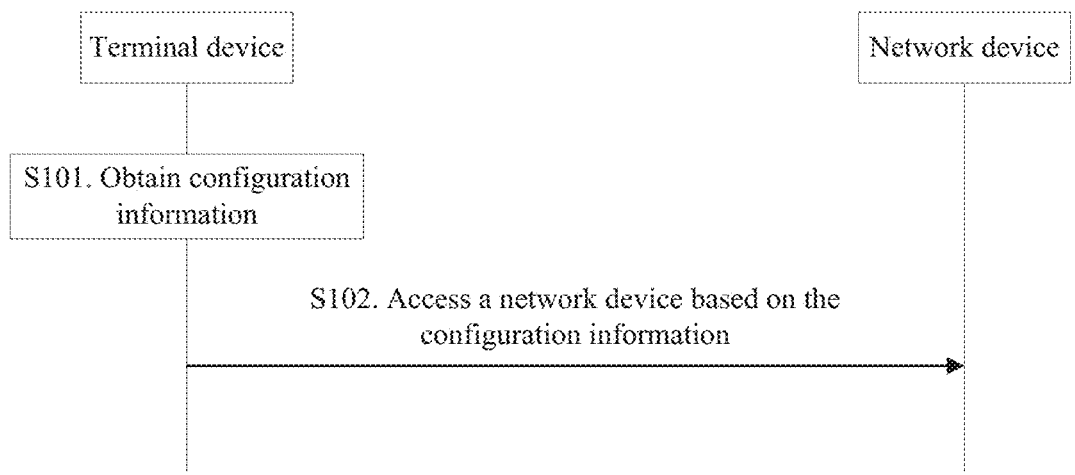
FIG. 5 is a schematic interactive diagram of a resource configuration method according to an embodiment of the present invention.

FIG. 5 is a schematic interactive diagram of a resource configuration method according to an embodiment of the present invention. The method includes the following steps.

S101. A terminal device obtains configuration information, where the configuration information includes at least one piece of the following information: random access configuration information and downlink signal parameter information.

S102. The terminal device accesses a network device based on the configuration information.

Correspondingly, the network device receives an access request of the terminal device.

In an implementation, the configuration information may be sent using system information (SI).

Specifically, S102 includes: determining, based on the configuration information, a random access resource and a random access preamble that are associated with a downlink signal; and sending the random access preamble to the network device on the random access resource.

Correspondingly, that the network device receives an access request of the terminal device specifically includes the following: The network device receives the random access preamble that is sent by the terminal device on the random access resource associated with the downlink signal.

The random access configuration information is specifically a configuration of random an access resource. The random access resource may also be understood as a random access occasion (RACH occasion/RACH transmission occasion/RACH opportunity/RACH chance) of one or more random access channels (RACH). One random access preamble format may be sent on one random access occasion, one random access burst RACH burst may include at least one random access occasion, and one random access burst set RACH burst set may include at least one random access burst. One downlink signal burst set is associated with one random access burst set, one downlink signal burst is associated with one random access burst, and the random access burst set is a random access time period. Detailed descriptions are provided below.

In addition, the configuration information may be pre-stored in the terminal device or a third-party storage device (e.g., the third-party storage device is a device other than the terminal device and the network device). The terminal device obtains the configuration information from a memory of the terminal device or the third-party storage device; or the terminal device may receive the configuration information sent from the network device.

In a multi-beam network, the network device sends a plurality of downlink signals to perform downlink synchronization, and each downlink signal is associated with an independent random access resource. Therefore, the configuration information may further include parameter information of the plurality of downlink signals. Detailed descriptions are also provided below.

For example, a structure of a random access resource may be as follows.

Figure 6:
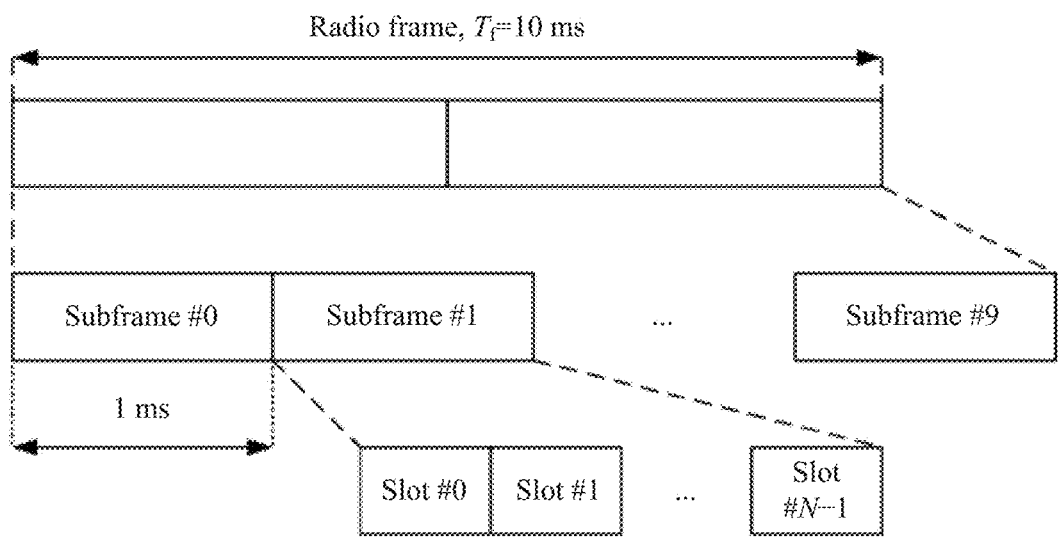
FIG. 6 is a schematic diagram of a frame structure.

FIG. 6 is a schematic diagram of a frame structure. A frame has a length of 10 ms, one subframe has a time length of 1 ms, and one subframe may include at least two slots.

Figure 7:
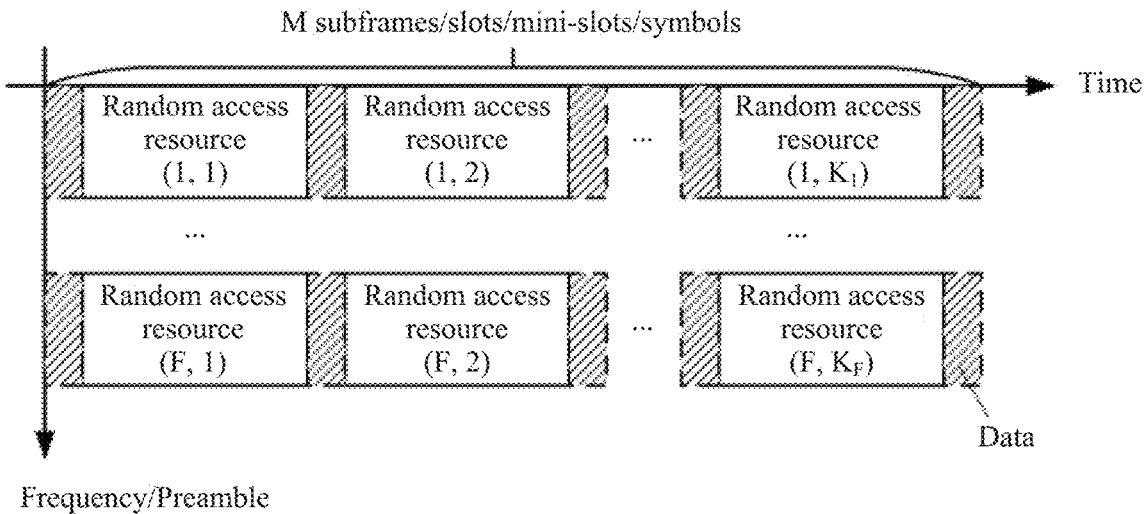
FIG. 7 is a schematic structural diagram of random access resources.

For example, FIG. 7 is a schematic structural diagram of random access resources. In M contiguous time units (which may be subframes, slots, mini-slots (mini slot), or orthogonal frequency division multiplexing (OFDM) symbols), there are K random access resources, and each random access resource (or RACH occasion) may be used by the terminal device to initiate one time of random access. Quantities of random access resources may be the same at different frequencies (in FIG. 7, there are K random access resources at each of frequencies 1 to F). Alternatively, quantities of random access resources may be different at different frequencies. For example, if correspondingly used random access preamble formats are different, corresponding resource time lengths are different, and therefore different quantities of random access resources are accommodated in a same time.

Figure 8A:
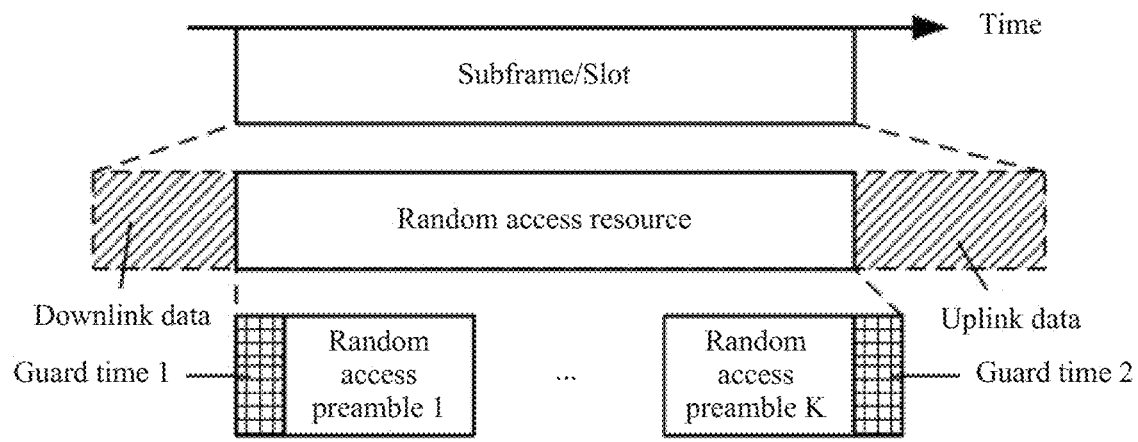
FIG. 8*a* is a schematic structural diagram of random access preambles on a single random access resource.

For example, FIG. 8*a* is a schematic structural diagram of random access preambles on a single random access resource. A slot or subframe includes downlink data, uplink data, a guard time, and a random access resource. The random access resource further includes K random access preambles (or random access preamble formats). The downlink data and the uplink data each may include 0 to 12 OFDM symbols. When there is no downlink data, and data transmission performed before a current resource is uplink transmission, a time length of a guard time 1 may be 0.

Figure 8B:
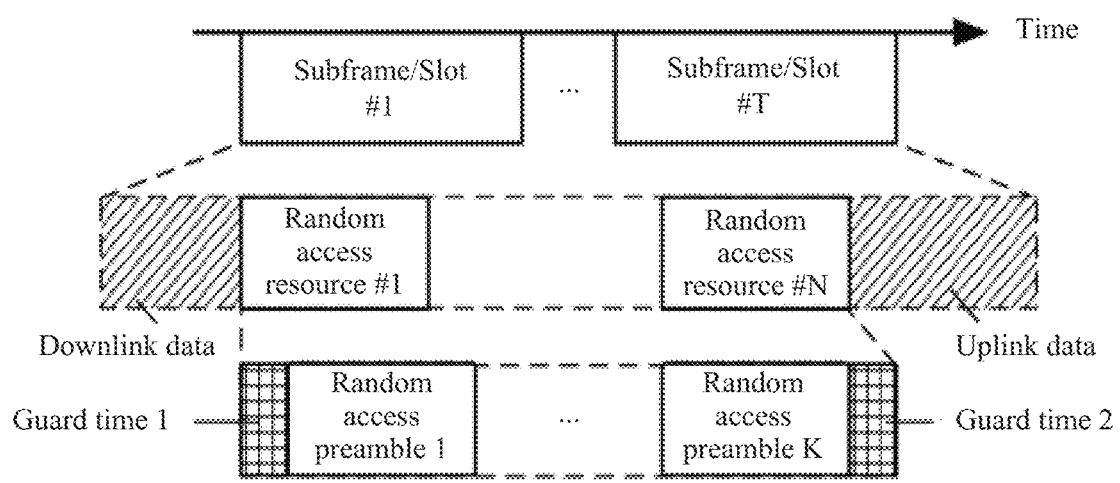
FIG. 8*b* is a schematic structural diagram of random access preambles on N random access resources.

For example, FIG. 8*b* is a schematic structural diagram of random access preambles on N random access resources. The N random access resources include K random access preambles, and downlink data and uplink data each may include 0 to 12 OFDM symbols. When there is no downlink data, a time length of a guard time 1 may be 0. In an implementation of FIG. 8*b*, T=1 to 64, N=1 to 64, and K=N*(1 to 14). A length of a cyclic prefix of the random access preamble is 32*(1 to 512) sampling Ts. A time length of the sampling Ts is a reciprocal of a sampling rate. For example, Ts=1/30.72/2n microsecond, where n is an integer.

In an implementation, the random access configuration (RACH configuration/allocation) information includes a start time, duration, and an end time of random access. A time unit may be at least one of the following: a subframe, a slot, a mini-slot, an OFDM symbol, or and a random access resource index. The start time represents a start location of one or more random access resources in a time period. The duration represents a time in which one or more random access resources are located, and the end time represents an end location of one or more random access resources in a time period.

Specifically, a slot number may be taken from 1 to K, and K is an integer. For example, K represents a total quantity of slots in one subframe, and a value of K is 2 to 64. A quantity of contiguous subframes on a physical random access channel (PRACH) may be 1 to 4. For example, this parameter may be obtained based on a preamble format without being indicated. A quantity of contiguous slots on the PRACH may be 1 to K, and K is an integer. For example, K represents a total quantity of slots in one subframe, and a value of K is 2 to 64. This parameter may also be obtained based on a preamble format without being indicated; or this parameter may be fixedly any one of 2, 4, 8, 16, and 32.

Further, the random access configuration information includes at least one of the following: a PRACH configuration index, a preamble format, a system frame number (SFN), a subframe number, a quantity of random access resources, a frequency quantity, a frequency start location, a frequency offset, a timing advance, random access preamble grouping information, and a subcarrier spacing.

The system frame number may be a value that makes Mod(SFN, N) a constant. For example, N is 2, and an odd-numbered frame and an even-numbered frame may be indicated. For another example, N is 3, and system frame numbers with Mod(SFN, N)=0, 1, and 2 may be indicated. For another example, N is 4 to 16, and N system frame locations may be specified. The quantity of random access resources is a quantity of random access resources included in a subframe or a slot. This parameter may not need to be indicated, for example, the quantity is fixed; or this parameter is obtained based on a preamble format, a quantity of contiguous subframes, or a quantity of contiguous slots. The frequency quantity may be F, where F=1 to 64, and represents a quantity of random access resources at a frequency. This parameter may not need to be indicated, either. For example, the parameter is fixedly 1. The frequency start location may be any nonnegative integer, and represents a frequency location of the first resource block in which a random access resource is located at a frequency. The frequency offset may be any nonnegative integer, and a specific frequency location of the random access resource may be determined based on the frequency offset and the frequency start location. This parameter may not need to be indicated, either. For example, the offset is fixedly 0. The timing advance may be any nonnegative integer, and represents an advance of time relative to a subframe, a slot, a mini-slot, or an OFDM symbol during random access transmission. This parameter may not need to be indicated, either. For example, the timing advance is fixedly 0. For specific definitions of these parameters, refer to the current system.

Further, the random access configuration information may further include at least one of the following: a quantity of downlink data symbols and a quantity of uplink data symbols. A quantity of downlink data symbols and a quantity of uplink data symbols on a PRACH resource each may be 0 to 13 OFDM symbols. This parameter may not need to be indicated, either. For example, the quantity is fixed, or this parameter is obtained based on a preamble format, a quantity of contiguous subframes, or a quantity of contiguous slots.

The random access configuration information may include the following possible cases, as shown in Table 1 of FIG. 16A (illustrating example 1 of random access configuration information), Table 2 of FIG. 16B (illustrating example 2 of random access configuration information), and/or Table 3 of FIG. 16C (illustrating example 3 of random access configuration information).

It should be noted that in Table 1 to Table 3, indexes of a subframe, a slot, a mini-slot, an OFDM symbol, and a random access resource may be respectively numbers of the subframe, the slot, the mini-slot, the OFDM symbol, and the random access resource. In addition, the random access configuration information may include the information in at least one of Table 1 to Table 3. For example, the quantity of random access resources may be obtained based on a preamble format, the quantity of contiguous subframes, the quantity of contiguous slots, a quantity of contiguous mini-slots, and the quantity of contiguous OFDM symbols. Therefore, the information, namely, the quantity of random access resources, may not be mandatory. The subframe number and the quantity of contiguous subframes, a slot number and the quantity of contiguous slots, a mini-slot number and a quantity of contiguous mini-slots, and the OFDM symbol and the quantity of contiguous OFDM symbols may be respectively represented by a subframe number set, a slot number set, a mini-slot number set, and an OFDM symbol number set.

In another implementation, an uplink/downlink configuration index parameter may be further added to the random access configuration information, and a subframe number-related configuration parameter is a tuple. The terminal device needs to determine a location of an uplink subframe in a system frame and a specific subframe number based on an uplink/downlink configuration and a subframe number-related configuration. The reason for using such a configuration is that the location of the uplink subframe may change, and therefore it is only feasible to use a parameter to indicate a relative location of the uplink subframe during random access, and a specific subframe number is determined based on the uplink subframe configuration and the relative location.

Then, the downlink signal parameter information, and an association (RACH association) between a downlink signal and a random access resource is described below.

In an implementation, the downlink signal parameter information includes at least one piece of the following information: a quantity of downlink signal bursts in a downlink signal burst set and a quantity of downlink signals in each downlink signal burst, as described in Table 4. A total quantity of downlink signals in the downlink signal burst set may be obtained based on the quantity of downlink signals in each downlink signal burst.

TABLE 4

Example 1 of the downlink signal parameter information

| Parameter name | Parameter value |
|---|---|
| K | Quantity of downlink signal bursts in a downlink signal burst set |
| $NBLK_{bstk}$ | Quantity of downlink signals in a downlink signal burst k, where k = 1, 2, . . . , K |

Further, in an implementation, the random access configuration information further includes at least one piece of the following information: an association relationship between downlink signals and random access resources, and a quantity of random access resources associated with each downlink signal burst.

In another implementation, the configuration information further includes at least one piece of the following information: an association relationship between downlink signals and random access resources, and a quantity of random access resources associated with each downlink signal burst.

In still another implementation, the downlink signal parameter information further includes at least one piece of the following information: the association relationship between downlink signals and random access resources, and a quantity of random access resources associated with each downlink signal burst.

The quantity of random access resources associated with the downlink signal burst k is $NRO_{bstk}$, where k=1, 2, . . . , K.

Further, in an implementation, quantities of downlink signals included in some downlink signal bursts in the downlink signal burst set are fixed values, for example, $NBLK_{bstk}$=1, 2, 3, 4, . . . , 64, and the quantities of downlink signals included in these downlink signal bursts do not need to be sent by a network. A quantity of downlink signals in another downlink signal burst is configured by using the downlink signal parameter information.

Further, in an implementation, the table may be searched, based on the downlink signal parameter information configuration, for the quantity of downlink signal bursts in the downlink signal burst set and the quantity of downlink signals included in each downlink signal burst.

Further, in an implementation, quantities of random access resources associated with some downlink signal bursts in the downlink signal burst set are fixed values, for example, $NRO_{bstk}$=1, 2, 3, 4, . . . , 64, and the quantities of random access resources associated with these downlink signal bursts do not need to be sent by a network. A quantity of random access resources associated with another downlink signal burst is configured by using the downlink signal parameter information.

Further, in an implementation, the table may be searched, based on the downlink signal parameter information configuration, for the quantity of random access resources associated with each downlink signal burst.

Further, in an implementation, the random access configuration information includes the downlink signal parameter information and/or an association between downlink signals and random access resources.

Based on the foregoing parameters, a total quantity NRO of random access resources associated with a downlink signal burst set can be determined as follows:

$$NRO = \Sigma_{k=0}^{K-1} NBLK_{bstk} NRO_{bstk}.$$

In addition, based on the random access configuration information, a total time length $T_{RA}$ of the random access resources associated with the downlink signal burst set may also be obtained ($T_{RA}$ is a time period corresponding to the associated random access resources). In another embodiment, $T_{RA}$ may be $2^n$ times 5 ms, where n is any nonnegative integer, for example, n=0, 1, 2, 3, 4, 5, 6, 7, 8, or 9. In another embodiment, a total quantity of random access resources within 10 ms or 5 ms is an integral multiple of the total resource quantity of random access resources associated with the downlink signal burst set, that is, $T_{RA}$=5 ms/n, where n is any positive integer.

In still another implementation, the association relationship between downlink signals and random access resources may be determined based on at least one of the following parameters: downlink signal indexes, random access resource indexes, the quantity of downlink signals in each downlink signal burst, and the quantity of random access resources associated with each downlink signal burst.

Specifically, in an implementation, all downlink signals in a downlink signal burst set are numbered, for example, k=0, 1, . . . , $\Sigma_{k=0}^{K-2} NBLK_{bstk}-1$; and all random access resources associated with the downlink signal burst set are numbered, for example, r=0, 1, . . . , NRO−1. The association relationship between downlink signals and random access resources may be a correspondence between designated downlink signal indexes i and random access resource indexes r. This correspondence is specifically shown in Formula (1):

$$r = \begin{cases} i \times NRO_{bst0} + (0 : NRO_{bst0} - 1), & i < NBLK_{bst0}, \\ NBLK_{bst0} NRO_{bst0} + (i - NBLK_{bst0}) NRO_{bst1} + (0 : NRO_{bst1} - 1), & i \geq NBLK_{bst0} \\ \cdots \\ \sum_{k=0}^{K-2} NBLK_{bstk} NRO_{bstk} + \left(i - \sum_{k=0}^{K-2} NBLK_{bstk}\right) NRO_{bstK-1} + (0 : NRO_{bstK-1} - 1), & i \geq \sum_{k=0}^{K-2} NBLK_{bstk}. \end{cases} \quad (1)$$

Time and frequency locations and a preamble of a random access resource can be correspondingly determined based on a correspondence between a logical downlink signal index and a random access resource index, and start location information of the random access resource.

In another embodiment, a start location of random access resources is the mth random access resource in a system frame SFN by default, and m is indicated using system information. The system frame meets Mod(SFN, $T_{RA}$/10 ms))=N, and N may be any nonnegative integer less than $T_{RA}/10$ ms. In another embodiment, m does not need to be indicated. For example, m is a fixed value, for example, m=0.

The network side sends, to the terminal device, the quantity of downlink signal groups, the quantity of downlink signals in each downlink signal group, the quantity of random access resources associated with each downlink signal group (or the total quantity of downlink signal in the downlink signal burst set), the start location of the random access resources, and a method for associating a random access resource with a downlink signal.

The terminal device side obtains the total quantity of random access resources associated with the downlink signal burst set and the specific location corresponding to each random access resource, based on the quantity of downlink signal bursts, the quantity of downlink signals in each downlink signal burst, the quantity of random access resources associated with each downlink signal burst (and/or the total quantity of downlink signals in the downlink signal burst set), and the random access configuration information.

In addition, the terminal device may further determine a period $T_{RA}$ corresponding to the random access resource, and specific time and frequency locations of each random access resource in the time period; and then obtain, according to the method for associating random access resources and based on an index of a downlink signal, time and frequency locations and a preamble of a random access resource associated with the downlink signal.

Figure 9A:
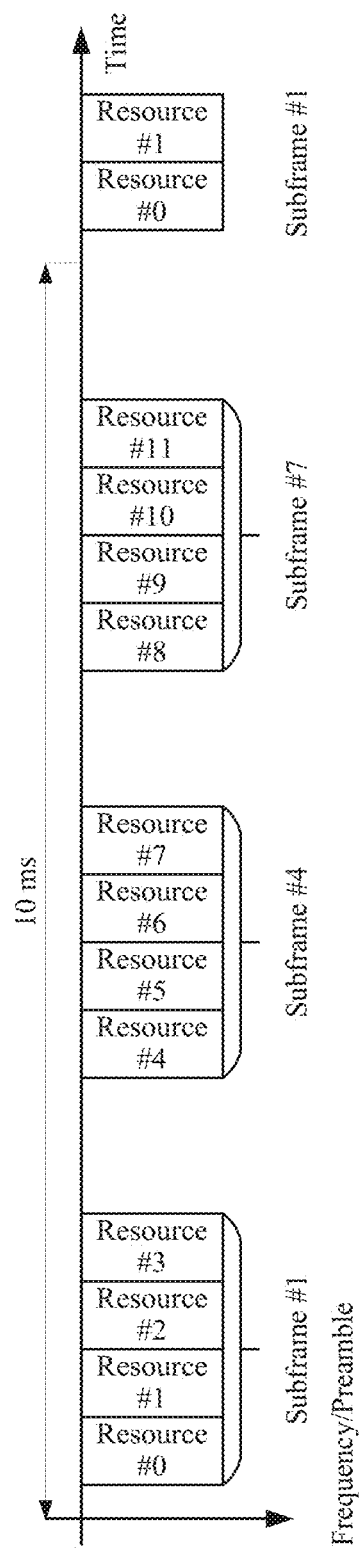
FIG. 9*a* is a schematic structural diagram of random access resources in an example random access configuration.
Figure 9B:
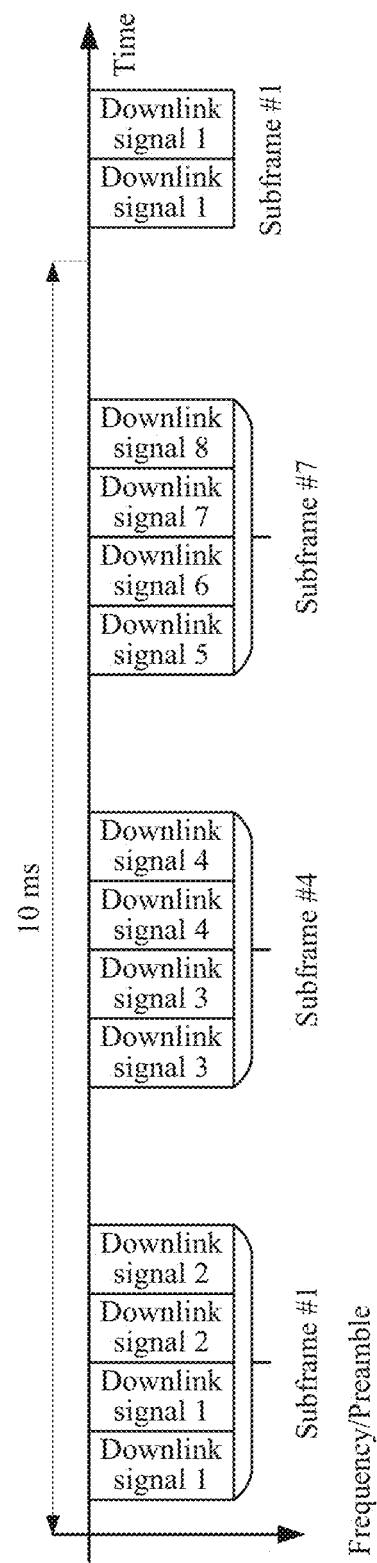
FIG. 9*b* is a schematic diagram of an association between downlink signals and random access resources in an example based on FIG. 9*a*.

For example, FIG. 9a is a schematic structural diagram of random access resources in an example random access configuration. Subframes 1, 4, and 7 in a system frame each include four random access resources. For another example, a random access burst set of a network includes eight downlink signals. The eight downlink signals are divided into two downlink signal bursts, and each downlink signal burst includes four downlink signals. Each random downlink signal in a first downlink signal burst is associated with two random access resources, and each random downlink signal in a second downlink signal burst is associated with one random access resource. A start location of the random access resources is 0, and a correspondence between logical indexes is described in Formula (1). A time period $T_{RA}=10$ ms of random access resources associated with a downlink signal burst set may be obtained based on the foregoing configuration, and a schematic diagram of locations of random access resources associated with the downlink signals is shown in FIG. 9b.

Figure 10:
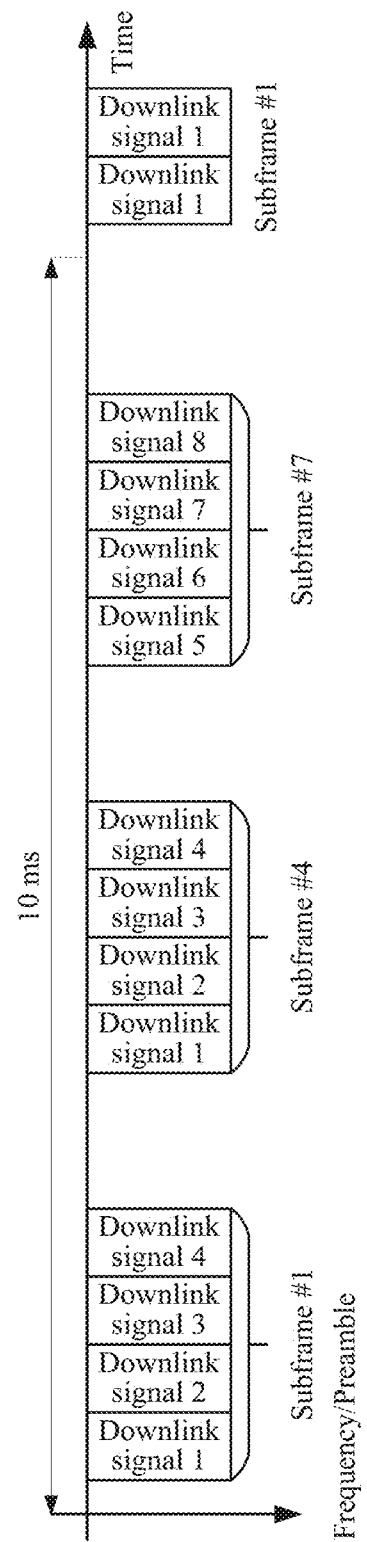
FIG. 10 is a schematic diagram of an association between downlink signals and random access resources in another example based on FIG. 9*a*.

Specifically, in another implementation, the association relationship between downlink signals and random access resources is determined based on the following parameters: offsets $\Delta_{k,j}$ of indexes of random access resources j associated with each downlink signal burst k, and the quantity of random access resources associated with each downlink signal burst. A specific association relationship may be obtained according to Formula (2):

For the random access resources in the random access configuration illustrated in FIG. 9a, according to the associating method expressed by Formula (2), the offsets are $\Delta_{0,0}=0$, $\Delta_{0,1}=4$, and $\Delta_{1,0}=0$; and a schematic diagram of an association between downlink signals and random access resources is shown in FIG. 10.

Specifically, in still another implementation, the association relationship between downlink signals and random access resources is determined based on the following parameters: offsets $\Delta_{k,j}$ of indexes of random access resources j associated with each downlink signal burst k, and the quantity of random access resources associated with each downlink signal burst. A specific association relationship may be obtained according to Formula (3):

$$r=i+\Delta_{k,j}K, 0\leq i<\text{NRO}, 0\leq k<K, 0\leq j<\text{NRO}_{bstk}, \quad (3)$$

Figure 11:
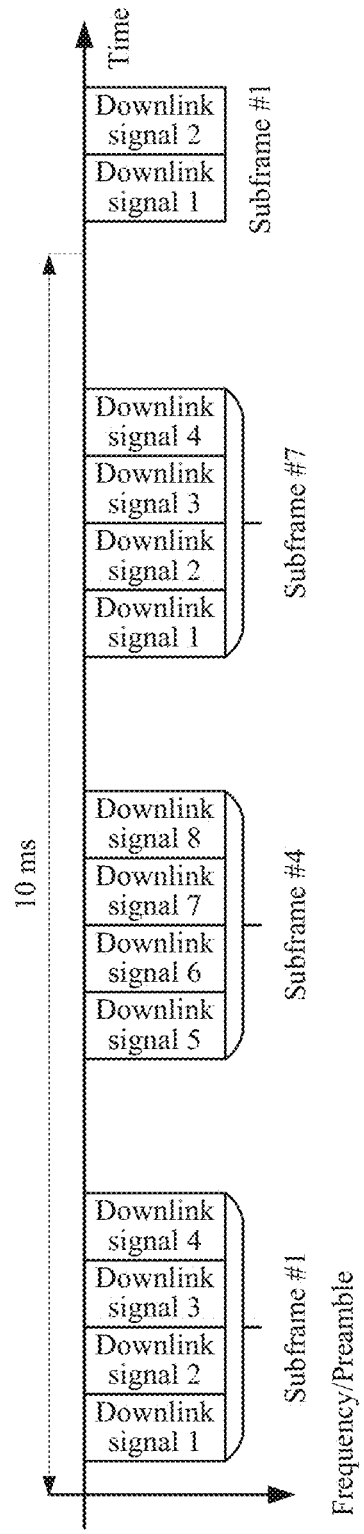
FIG. 11 is a schematic diagram of an association between downlink signals and random access resources in still another example based on FIG. 9*a*.

For the random access resources in the random access configuration illustrated in FIG. 9a, according to the associating method expressed by Formula (3), the offsets are $\Delta_{0,0}=0$, $\Delta_{0,1}=8$, and $\Delta_{1,0}=0$; and a schematic diagram of an association between downlink signals and random access resources is shown in FIG. 11.

Figure 12A:
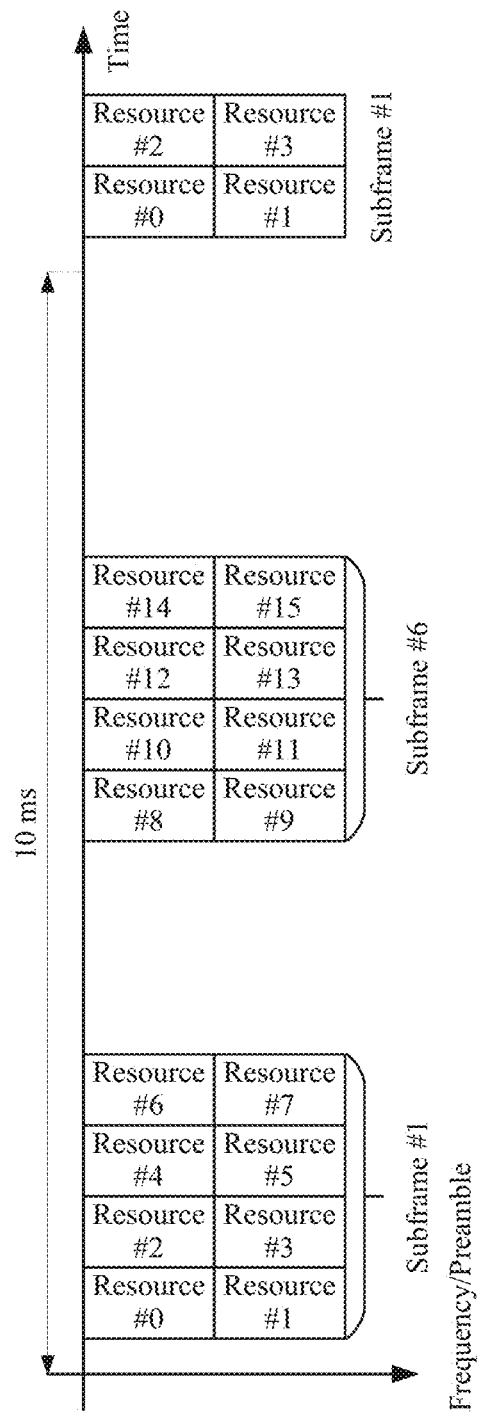
FIG. 12*a* is a schematic structural diagram of random access resources in another example random access configuration.
Figure 12B:
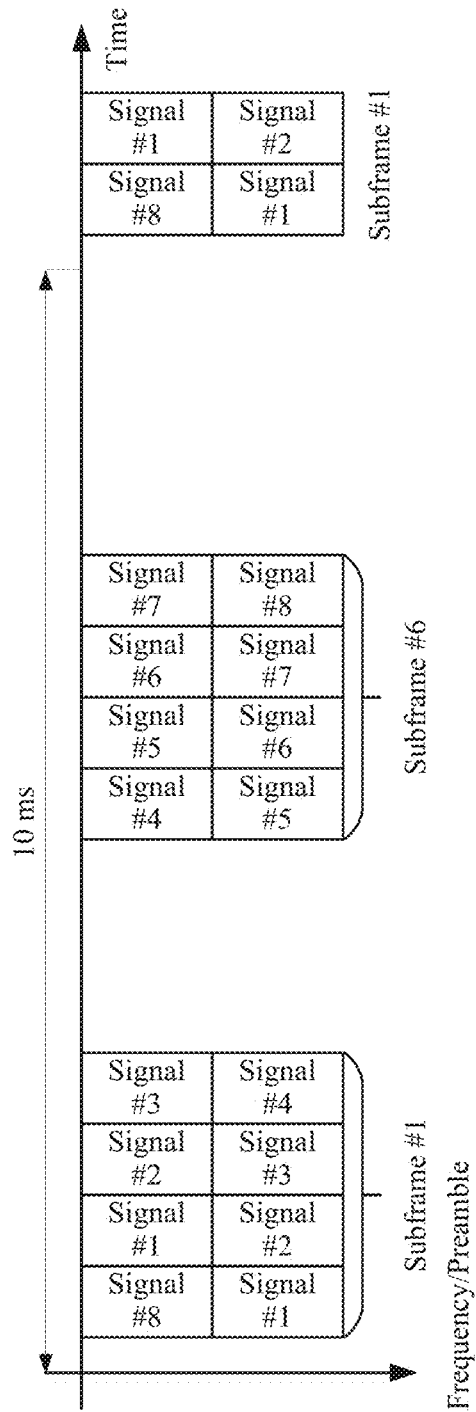
FIG. 12*b* is a schematic diagram of an association between downlink signals and random access resources in an example based on FIG. 12*a*.

For another example, FIG. 12a shows a random access resource in an example random access configuration. Subframes 1 and 6 in a system frame each include eight random access resources. For another example, a random access burst set of a network includes eight downlink signals, which are included in one downlink signal burst. In other words, one downlink signal burst includes eight downlink signals. Each downlink signal in the downlink signal burst is associated with two random access resources, and a start location of the random access resources is 0. A correspondence between logical indexes is described in Formula (4), where $\Delta_{k,j}$ is an offset. The offset may be designated using system information, or may be fixedly a value (which does not need to be designated using system information). For example, $\Delta_{k,j}=1$ in FIG. 12. A time period $T_{RA}=10$ ms of random access resources associated with a downlink signal burst set may be obtained based on the foregoing configuration, and locations of random access resources associated with the downlink signals are shown in FIG. 12b.

$$r = \begin{cases} i + \Delta_{0,j} \times NBLK_{bst0}, & i < NBLK_{bst0}, 0 \leq j < NRO_{bst0}, \\ NBLK_{bst0}NRO_{bst0} + (i - NBLK_{bst0}) + \Delta_{1,j} \times NRO_{bst1}, & i \geq NBLK_{bst0}, 0 \leq j < NRO_{bst1}, \\ \cdots \\ \sum_{k=0}^{K-2} NBLK_{bstk}NRO_{bstk} + \left(i - \sum_{k=0}^{K-2} NBLK_{bstk}\right) + \Delta_{K-1,j} \times NBLK_{bstK-1}, & i \geq \sum_{k=0}^{K-2} NBLK_{bstk}, 0 \leq j < NRO_{bstK-1}. \end{cases} \quad (2)$$

$$r = \begin{cases} i \times NRO_{bst0} + \Delta_{0,j}, & i < NBLK_{bst0}, 0 \le j < NRO_{bst0}, \\ NBLK_{bst0}NRO_{bst0} + (i - NBLK_{bst0})NRO_{bst1} + \Delta_{1,j}, & i \ge NBLK_{bst0}, 0 \le j < NRO_{bst1}, \\ \quad \ldots \\ \sum_{k=0}^{K-2} NBLK_{bstk}NRO_{bstk} + \left(i - \sum_{k=0}^{K-2} NBLK_{bstk}\right)NRO_{bstK-1} + \Delta_{K-1,j}, & i \ge \sum_{k=0}^{K-2} NBLK_{bstk}, 0 \le j < NRO_{bstK-1}. \end{cases} \quad (4)$$

In another embodiment, an index i of a downlink signal may be represented as a combination of an index k of a downlink signal burst, and an index m of the downlink signal in the downlink signal burst k. In other words, downlink signal indexes may be numbers of all downlink signals in the downlink signal burst set, or a downlink signal index may be represented by two levels of indexes: and index of a downlink signal burst and an index of a downlink signal in the downlink signal burst.

In another embodiment, the offset may be a fixed value. In this case, the offset does not need to be indicated using system information.

In still another implementation, the downlink signal parameter information includes at least one piece of the following information: a total quantity of random access resources associated with a downlink signal burst set, downlink signal indexes, indexes of random access resources associated with downlink signals, and a quantity of random access resources associated with downlink signals. The downlink signal parameter information is specifically described in Table 5.

TABLE 5

Example 2 of the downlink signal parameter information

| Parameter name | Parameter value |
|---|---|
| NRO | Total quantity of random access resources associated with a downlink signal burst set |
| k | Downlink signal index |
| {$r_1, r_2, \ldots, r_{blk}$} | Indexes of random access resources associated with downlink signals k |

In addition, based on the random access configuration information, a total time length $T_{RA}$ of the random access resources associated with the downlink signal burst set may be obtained ($T_{RA}$ is a time period corresponding to the associated random access resources). In another embodiment, $T_{RA}$ may be 2n times 5 ms, where n is any nonnegative integer, for example, n=0, 1, 2, 3, 4, 5, 6, 7, 8, or 9. In another embodiment, a total quantity of random access resources within 10 ms or 5 ms is an integral multiple of the total quantity of random access resources associated with the downlink signal burst set.

All the random access resources associated with the downlink signal burst set are numbered, for example, r=0, 1, . . . , NRO−1.

In another embodiment, a start location of random access resources is the mth random access resource in a system frame SFN by default, and m is indicated using system information. The system frame meets Mod(SFN,$T_{RA}$/10 ms)=N, and N may be any nonnegative integer less than $T_{RA}$/10 ms. In another embodiment, m does not need to be indicated. For example, m is a fixed value, for example, m=0.

The network device side sends the total quantity of downlink signals in the downlink signal burst set, the downlink signal indexes, and the indexes of random access resources corresponding to downlink signals, and the start location of random access resources.

The terminal device side receives the total quantity of random access resources associated with the downlink signal burst set and the random access configuration information, and determines the period $T_{RA}$ corresponding to the random access resources, and specific time and the frequency locations of each random access resource in the time period. Then the terminal device obtains time and frequency locations and a preamble of a random access resource associated with a downlink signal, based on an index of the downlink signal, an index of the random access resource corresponding to the downlink signal, and the start location of random access resources.

In another embodiment, the period $T_{RA}$ may be sent using system information.

Further, in an implementation, the random access configuration information includes the downlink signal parameter information and/or an association between downlink signals and random access resources.

Further, in an implementation, the system information includes the downlink signal parameter information and/or an association between downlink signals and random access resources.

In still another implementation, the method further includes the following: The terminal device receives at least one piece of the following information from the network device: an index of the random access preamble, an index of the downlink signal, random access resources associated with downlink signals in a downlink signal burst set, a random access time period (for example, the $N^{th}$ period $T_{RA}$), and a total quantity of random access resources associated with downlink signals in a downlink signal burst set (this is described from a perspective of a quantity of discrete random access resources, can achieve same effects as the $T_{RA}$ method). This implementation is a resource configuration manner in a non-contention mode, and the network device directly designates a random access resource associated with a downlink signal.

In still another implementation, the downlink signal may be a synchronization signal block (SS block). The index of the downlink signal may be an index of the synchronization signal block.

In still another implementation, a transmit power for sending the random access preamble by the terminal device is related to at least one of the following parameters: a maximum quantity of tried beams, a quantity of times of sending the random access preamble by the terminal device, and a maximum quantity of transmissions allowable within a time of random access resources associated with a downlink signal burst set, where the quantity of times of sending the random access preamble is less than or equal to a maximum quantity of preamble transmissions.

In a specific example, the network device indicates resources used for random access and the association between downlink signals and random access resources. Based on the indication information, the terminal device obtains one or more downlink signals, and determines specific time and frequency locations and preambles of random access resources associated with the downlink signals, and the total time length $T_{RA}$ of the random access resources associated with the downlink signal burst set. The network device further indicates a maximum quantity of preamble transmissions preambleTransMax, and a maximum quantity of transmissions preambleSetMax allowable within a total time length of random access resources associated with each downlink signal burst set, for example, preambleSetMax=1, 2, 3, . . . , 64. After each random access transmission, a preamble transmission counter PREAMBLE_TRANSMISSION_COUNTER is increased by 1. The preamble transmit power is related to the preamble transmission counter and the maximum quantity of transmissions preambleSetMax allowable within the total time length of the random access resources associated with the downlink signal burst set. For example, a target transmission power may be:

preambleInitialReceivedTargetPower+DELTA_PREAMBLE+(floor(PREAMBLE_TRANSMISSION_COUNTER/preambleSetMax)−1)*powerRampingStep, where preambleInitialReceivedTargetPower represents an initial preamble power, and is designated using system information; DELTA_PREAMBLE represents a power offset corresponding to a preamble format, and is determined based on the preamble format; and powerRampingStep represents a power ramping factor, and is designated using system information.

In another embodiment, the PREAMBLE_TRANSMISSION_COUNTER is related only to $T_{RA}$. For example, the PREAMBLE_TRANSMISSION_COUNTER is 1 in the first $T_{RA}$ in which the random access preamble is sent, the PREAMBLE_TRANSMISSION_COUNTER is 2 in the second $T_{RA}$ in which the random access preamble is sent, and PREAMBLE_TRANSMISSION_COUNTER is k in the $k^{th}$ $T_{RA}$ in which the random access preamble is sent.

In another specific example, the terminal device side does not know that a transmit beam differs relatively greatly from a receive beam, and therefore the terminal device needs to try a plurality of different transmit beams. The network side designates a maximum quantity of tried beams UEbeamMax, or the terminal device side needs to select a UEbeamMax from a UEbeamMaxSet including a plurality of quantities of tried beams designated by the network device. For example, UEbeamMaxSet={1, 2, 3, . . . , 64}. The preamble transmit power is related to at least one of the preamble transmission counter PREAMBLE_TRANSMISSION_COUNTER, the maximum quantity of transmissions preambleSetMax allowable within the total time length of the random access resources associated with the downlink signal burst set, and the UEbeamMax. For example, the preamble transmit power may be:

preambleInitialReceivedTargetPower+DELTA_PREAMBLE+(floor(PREAMBLE_TRANSMISSION_COUNTER/preambleSetMax/UEbeamMax)−1)*powerRampingStep.

In still another implementation, the terminal device tries N different transmit beams, and N≥2. The terminal device first tries one transmit beam, and then changes to another transmit beam. The terminal device maintains a plurality of preamble transmission counters PREAMBLE_TRANSMISSION_COUNTER(i), and i=1, 2, . . . , N. The network device may also designate a weighting coefficient powerRampingScale(i) of a power ramping factor corresponding to a transmit beam i, to accelerate power ramping when there are a relatively large quantity of beams, where powerRampingScale(i) may be a nonnegative real number. The preamble transmit power corresponding to the transmit beam i is related to the preamble transmission counter PREAMBLE_TRANSMISSION_COUNTER(i) and the weighting coefficient powerRampingScale(i) of the power ramping factor. For example, the terminal device has two transmit beams, and the network device designates a weighting coefficient powerRampingScale(2) of a power ramping factor for the second beam. A transmit power on the first beam is:

preambleInitialReceivedTargetPower+DELTA_PREAMBLE+(PREAMBLE_TRANSMISSION_COUNTER−1)*powerRampingStep.

Transmit power on the second transmit beam is:

preambleInitialReceivedTargetPower+DELTA_PREAMBLE+((PREAMBLE_TRANSMISSION_COUNTER−1)*powerRampingScale(2)*powerRampingStep.

The transmit beam may be used to send a downlink signal, for example, send a reference signal. For example, the reference signal is a channel state information-reference signal (CSI-RS), a demodulation reference signal (DMRS), or a phase-tracking reference signal (PTRS).

According to the resource configuration method provided in this embodiment of the present invention, a simple resource configuration solution is provided for a multi-beam network, thereby implementing random access associated with a downlink signal in the multi-beam network.

The methods in the embodiments of the present invention are described above in detail. Apparatuses in the embodiments of the present invention are provided below.

Figure 13:
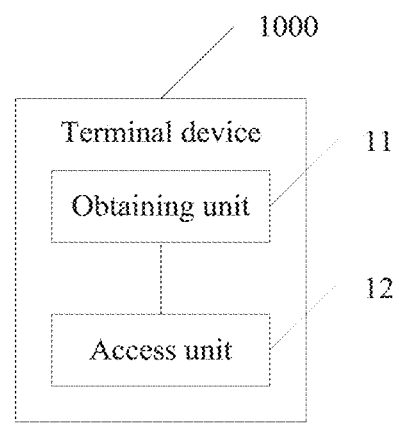
FIG. 13 is a schematic modular diagram of a terminal device according to an embodiment of the present invention.

FIG. 13 is a schematic modular diagram of a terminal device according to an embodiment of the present invention. The terminal device 1000 may include an obtaining unit 11 and an access unit 12. The obtaining unit 11 is configured to perform an operation of obtaining configuration information, for example, performing S101. The access unit 12 is configured to communicate with a network device, for example, performing S102. For details, refer to the descriptions in the method embodiments. Details are not described herein again.

According to the terminal device provided in this embodiment of the present invention, a simple resource configuration solution is provided for a multi-beam network, thereby implementing random access associated with a downlink signal in the multi-beam network.

Figure 14:
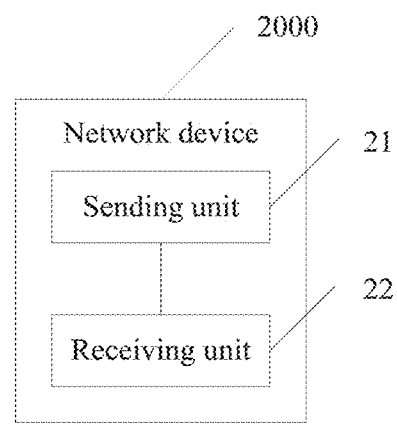
FIG. 14 is a schematic modular diagram of a network device according to an embodiment of the present invention.

FIG. 14 is a schematic modular diagram of a network device according to an embodiment of the present invention. The network device 2000 may include a sending unit 21 and a receiving unit 22. The sending unit 21 is configured to perform a downlink operation with a terminal device, for example, sending configuration information to the terminal device, to correspond to S101. The receiving unit 22 is configured to perform an uplink operation with the terminal device, for example, receiving an access request of the terminal device, to correspond to S102. For details, refer to the descriptions in the method embodiments. Details are not described herein again.

According to the network device provided in this embodiment of the present invention, a simple resource configuration solution is provided for a multi-beam network, thereby implementing random access associated with a downlink signal in the multi-beam network.

An embodiment of the present invention further provides a terminal device. The terminal device may be the terminal device in the foregoing communications system, and the terminal device may have a hardware architecture shown in FIG. 15. The terminal device may include a receiver, a transmitter, a memory, and a processor. The receiver, the transmitter, the memory, and the processor are connected to each other through a bus. The transmitter may be used to implement related functions implemented by the access unit 12 or the obtaining unit in FIG. 13 or a sending unit, and the receiver may be used to implement related functions implemented by a receiving unit.

The memory includes but is not limited to a random access memory (RAM), a read-only memory (ROM), an erasable programmable read only memory (EPROM), or a compact disc read-only memory (CD-ROM). The memory is configured to store a related instruction and data.

The receiver is configured to receive data and/or a signal, and the transmitter is configured to send data and/or a signal. The transmitter and the receiver may be independent components, or may be an integrated component, for example, a transceiver.

The processor may include one or more processors, for example, include one or more central processing units (CPU). When the processor is one CPU, the CPU may be a single-core CPU or a multi-core CPU.

The memory is configured to store program code and data of the terminal device, and may be an independent component or may be integrated into the processor.

The components may be integrated into a chip for implementation, for example, integrated into a baseband chip for implementation.

Specifically, the processor is configured to perform an operation of obtaining configuration information, for example, performing S101; and the transmitter is configured to communicate with a network device, for example, performing S102.

For details, refer to the descriptions in the method embodiments. Details are not described herein again.

Figure 15:
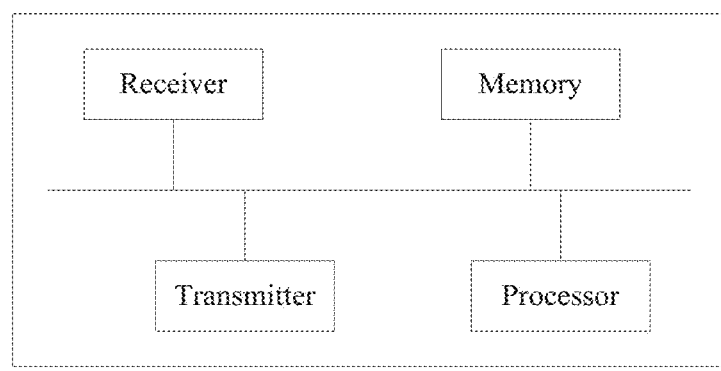
FIG. 15 is a schematic diagram of a hardware structure of a terminal device/network device according to an embodiment of the present invention.

It may be understood that FIG. 15 shows merely a simplified design of the terminal device. In actual application, the terminal device may further include another necessary element, including but not limited to any quantity of transceivers, processors, controllers, and memories. All terminal devices that can implement the embodiments of the present invention fall within the protection scope of the present invention.

According to the terminal device provided in this embodiment of the present invention, a simple resource configuration solution is provided for a multi-beam network, thereby implementing random access associated with a downlink signal in the multi-beam network.

An embodiment of the present invention further provides a network device. The network device may be the network device in the foregoing communications system, and the network device may have a hardware architecture shown in FIG. 15. The network device may include a receiver, a transmitter, a memory, and a processor. The receiver, the transmitter, the memory, and the processor are connected to each other through a bus. The receiver may be used to implement related functions implemented by the receiving unit 22 in FIG. 14, and the transmitter may be used to implement related functions implemented by the sending unit 21.

The memory includes but is not limited to a RAM, a ROM, an EPROM, or a CD-ROM. The memory is configured to store a related instruction and data.

The receiver is configured to receive data and/or a signal, and the transmitter is configured to send data and/or a signal. The transmitter and the receiver may be independent components, or may be an integrated component, for example, a transceiver.

The processor may include one or more processors, for example, include one or more CPUs. When the processor is one CPU, the CPU may be a single-core CPU or a multi-core CPU.

The memory is configured to store program code and data of the network device, and may be an independent component or may be integrated into the processor.

The components may be integrated into a chip for implementation, for example, integrated into a baseband chip for implementation.

Specifically, the transmitter is configured to perform a downlink operation with a terminal device, for example, sending configuration information to the terminal device, to correspond to S101; and the receiver is configured to perform an uplink operation with the terminal device, for example, receiving an access request of the terminal device, to correspond to S102. For details, refer to the descriptions in the method embodiments. Details are not described herein again.

It may be understood that FIG. 15 shows merely a simplified design of the network device. In actual application, the network device may further include another necessary element, including but not limited to any quantity of transceivers, processors, controllers, and memories. All network devices that can implement the present invention fall within the protection scope of the present invention.

According to the network device provided in this embodiment of the present invention, a simple resource configuration solution is provided for a multi-beam network, thereby implementing random access associated with a downlink signal in the multi-beam network.

A person of ordinary skill in the art may be aware that the units and algorithm steps in the examples described with reference to the embodiments disclosed in this specification may be implemented by electronic hardware or a combination of computer software and electronic hardware. Whether the functions are executed by hardware or software depends on particular applications and design constraints of the technical solutions. A person skilled in the art may use a different method to implement the described functions for each particular application, but it should not be considered that the implementation goes beyond the scope of this application.

It may be clearly understood by a person skilled in the art that, for ease of convenience and brevity, for a detailed working process of the foregoing system, apparatus, and unit, refer to a corresponding process in the foregoing method embodiments. Details are not described herein again. In the several embodiments provided in this application, it should be understood that the disclosed system, apparatus, and method may be implemented in other manners. For example, the described apparatus embodiments are merely examples. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electric, mechanical, or other forms.

The units described as separate parts may or may not be physically separate. Parts displayed as units may or may not be physical units, and may be located in one position or distributed on a plurality of network units. Some or all of the units may be selected according to actual requirements to achieve the objectives of the solutions of the embodiments. In addition, functional units in the embodiments of this application may be integrated into one processing unit, or each of the units may exist alone physically, or two or more units are integrated into one unit.

All or some of the foregoing embodiments may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on a computer, the procedures or functions according to the embodiments of the present invention are all or partially generated. The computer may be a general purpose computer, a dedicated computer, a computer network, or another programmable apparatus. The computer instructions may be stored in a computer-readable storage medium, or may be transmitted by using a computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

A person of ordinary skill in the art may understand that all or some of the processes of the methods in the embodiments may be implemented by a computer program instructing related hardware. The program may be stored in a computer-readable storage medium. When the program is run, the processes of the methods in the embodiments are performed. The foregoing storage medium includes any medium that can store program code, such as a ROM, a random access memory RAM, a magnetic disk, or an optical disc.

In this application, "at least one" means one or more, and "a plurality of" means two or more. "And/or" describes an association relationship between associated objects, and indicates that three relationships may exist. For example, A and/or B may indicate the following three cases: A exists alone, both A and B exist, and B exists alone, where A and B may be singular or plural. The character "/" usually indicates an "or" relationship between the associated objects. "At least one of the following" or an expression similar to this indicate any combination of the following, including any combination of one or more of the following. For example, at least one of a, b, or c may indicate: a, b, c, a-b, a-c, b-c, or a-b-c, where a, b, and c may be singular or plural.

The invention claimed is:

1. A method, performed by a terminal device or a chip for the terminal device, the method comprising:
   obtaining configuration information from a network device, wherein the configuration information comprises random access configuration information and parameter information of a plurality of downlink signals, wherein each downlink signal of the plurality of downlink signals is a synchronization signal block (SS) block;
   determining, based on the random access configuration information, a periodicity of $T_{RA}$, wherein each periodic $T_{RA}$ is an association period during which random access resources are associated with the plurality of downlink signals, the random access resources being configured by the random access configuration information;
   determining, based on the configuration information, a first random access resource of the random access resources and a random access preamble that are associated with a first downlink signal of the plurality of downlink signals, wherein the association between the first random access resource and the first downlink signal has a periodicity of the $T_{RA}$; and
   sending the random access preamble to the network device on the first random access resource.

2. The method of claim 1, wherein the plurality of downlink signals are included in a downlink signal burst.

3. The method according to claim 1, wherein:
   the random access configuration information further comprises:
      a quantity of random access resources associated with a downlink signal of the plurality of downlink signals, or indexes of random access resources associated with a downlink signal of the plurality of downlink signals, wherein each random access resource of the random access resources is a random access channel occasion (RACH) occasion; or
   the parameter information of the plurality of downlink signals comprises:
      a quantity of random access resources associated with a downlink signal of the plurality of downlink signals, or indexes of random access resources associated with a downlink signal of the plurality of downlink signals, wherein each random access resource of the random access resources is a random access channel occasion (RACH) occasion.

4. The method according to claim 1, wherein a value of the periodicity $T_{RA}$ is a $2^n$ multiple of 5 milliseconds (ms), and n is an integer between 0 and 9.

5. An apparatus, comprising:
   at least one processor; and
   at least one computer readable memory storing instructions that are executable by the at least one processor, the instructions comprising instructions for:
      obtaining configuration information from a network device, wherein the configuration information comprises random access configuration information and parameter information of a plurality of downlink signals, wherein each downlink signal of the plurality of downlink signals is a synchronization signal block (SS) block;
      determining, based on the random access configuration information, a periodicity of $T_{RA}$, wherein each periodic $T_{RA}$ is an association period during which random access resources are associated with the plurality of downlink signals, the random access resources being configured by the random access configuration information;
      determining, based on the configuration information, a first random access resource of the random access resources and a random access preamble that are associated with a first downlink signal of the plurality of downlink signals, wherein the association between the first random access resource and the downlink signal has a periodicity of the $T_{RA}$; and sending the random access preamble to the network device on the first random access resource.

6. The apparatus according to claim 5, wherein the random access configuration information comprises one or more pieces of the following information:

a preamble format, a system frame number (SFN) of a random access resource of the random access resources, a subframe number of a random access resource of the random access resources, a start orthogonal frequency division multiplexing (OFDM) symbol for a random access resource of the random access resources, random access preamble grouping information, a subcarrier spacing, a starting position of a frequency where a random access resource of the of the random access resources is located, or a timing advance (TA).

7. The apparatus according to claim 5, wherein:
the random access configuration information further comprises:
a quantity of random access resources associated with a downlink signal of the plurality of downlink signals, or indexes of random access resources associated with a downlink signal of the plurality of downlink signals, wherein each random access resource of the random access resources is a random access channel occasion (RACH) occasion; or
the parameter information of the plurality of downlink signals comprises:
a quantity of random access resources associated with a downlink signal of the plurality of downlink signals, or indexes of random access resources associated with a downlink signal of the plurality of downlink signals, wherein each random access resource of the random access resources is a random access channel occasion (RACH) occasion.

8. The apparatus according to claim 5, wherein a value of the periodicity $T_{RA}$ is a $2^n$ multiple of 5 milliseconds (ms), and n is an integer between 0 and 9.

9. The apparatus according to claim 5, wherein a value of the periodicity $T_{RA}$ is one or more of the following:
10 ms, 20 ms, 40 ms, 80 ms, or 160 ms.

10. The apparatus according to claim 5, wherein a system frame number (SFN) where a start location of the random access resources associated with the plurality of downlink signals is located satisfies the following formula:
Mod (SFN, $T_{RA}$/10 ms)=N, wherein N is non-negative integer less than $T_{RA}$/10 ms, Mod is a modulo operation.

11. The apparatus according to claim 10, wherein the SFN where the start location of the random access resources associated with the plurality of downlink signals is located is system frame number 0.

12. The apparatus according to claim 5, wherein a transmit power of the random access preamble is related to at least one of the following parameters:

a maximum quantity of tried beams which is allowable, a quantity of times of sending the random access preamble, or a maximum quantity of transmissions allowable within a time of random access resources associated with a downlink signal burst set, wherein the quantity of times of sending the random access preamble is less than or equal to a maximum quantity of preamble transmissions.

13. The apparatus according to claim 5, wherein the random access configuration information is random access configuration information in a non-contention mode, and the random access configuration information in the non-contention mode includes at least one of the following parameters:
an index of a downlink signal, the first random access resource associated with the first downlink signal, or a time period $T_{RA}$ of the first random access resource associated with the first downlink signal.

14. The apparatus according to claim 5, wherein the parameter information of the plurality of downlink signals includes at least one piece of the following information: a quantity of downlink signal groups in a downlink signal burst set, or a quantity of downlink signals in each downlink signal group.

15. The apparatus according to claim 5, wherein the random access configuration information further includes at least one piece of the following information: an association relationship between the plurality of downlink signals and the random access resources, or a quantity of random access resources associated with each downlink signal group.

16. The apparatus according to claim 5, wherein the plurality of downlink signals are included in a downlink signal burst.

17. The apparatus according to claim 5, wherein the configuration information is carried in system information.

18. A method, performed by a network device or a chip for the network device, the method comprising:
sending configuration information to a terminal device, wherein the configuration information comprises random access configuration information and parameter information of a plurality of downlink signals, wherein each downlink signal of the plurality of downlink signals is a synchronization signal block (SS block);
determining, based on the random access configuration information, a periodicity of $T_{RA}$, wherein each periodic $T_{RA}$ is an association period during which random access resources are associated with the plurality of downlink signals, the random access resources being configured by the random access configuration information; and
receiving a random access preamble from the terminal device on a first random access resource of the random access resources, wherein the random access preamble and the first random access resource are associated with a first downlink signal of the plurality of downlink signals, and wherein the association between the first random access resource and the first downlink signal has a periodicity of the $T_{RA}$.

19. The method according to claim 18, wherein the plurality of downlink signals are included in a downlink signal burst.

20. The method according to claim 18, wherein:
the random access configuration information further comprises:
a quantity of random access resources associated with a downlink signal of the plurality of downlink signals, or indexes of random access resources associated with a downlink signal of the plurality of downlink signals, wherein each random access resource of the random access resources is a random access channel occasion (RACH) occasion; or
the parameter information of the plurality of downlink signals comprises:
a quantity of random access resources associated with a downlink signal of the plurality of downlink signals, or indexes of random access resources associated with a downlink signal of the plurality of downlink signals, wherein each random access resource of the random access resources is a random access channel occasion (RACH) occasion.

21. The method according to claim 18, wherein a value of the periodicity $T_{RA}$ is a $2^n$ multiple of 5 milliseconds (ms), and n is an integer between 0 and 9.

22. The method according to claim 18, wherein a value of the periodicity $T_{RA}$ is one or more of the following: 10 ms, 20 ms, 40 ms, 80 ms, or 160 ms.

23. An apparatus, comprising:
 at least one processor; and
 a computer readable storage medium storing instructions, the instructions including instructions for:
  sending configuration information to a terminal device, wherein the configuration information comprises random access configuration information and parameter information of a plurality of downlink signals, wherein each downlink signal of the plurality of downlink signals is a synchronization signal block (SS block);
  determining, based on the random access configuration information, a length of a time period ($T_{RA}$) periodicity of $T_{RA}$ for mapping the plurality of downlink signals onto the random access resources, wherein each periodic $T_{RA}$ is an association period during which random access resources are associated with the plurality of downlink signals, the random access resources being configured by the random access configuration information; and
  receiving a random access preamble from the terminal device on a first random access resource of the random access resources, wherein the random access preamble and the first random access resource are associated with a first downlink signal of the plurality of downlink signals, and wherein the association between the first random access resource and the first downlink signal has a periodicity of the $T_{RA}$.

24. The apparatus according to claim 23, wherein the plurality of downlink signals are included in a downlink signal burst.

25. The apparatus according to claim 23, wherein:
 the random access configuration information further comprises:
  a quantity of random access resources associated with a downlink signal of the plurality of downlink signals, or indexes of random access resources associated with the a downlink signal of the plurality of downlink signals, wherein each random access resource of the random access resources is a random access channel occasion (RACH) occasion; or
 the parameter information of the plurality of downlink signals comprises:
  a quantity of random access resources associated with a downlink signal of the plurality of downlink signals, or indexes of random access resources associated with a downlink signal of the plurality of downlink signals, wherein each random access resource of the random access resources is a random access channel occasion (RACH) occasion.

26. The apparatus according to claim 23, wherein a value of the periodicity $T_{RA}$ is a $2^n$ multiple of 5 milliseconds (ms), and n is an integer between 0 and 9.

27. The apparatus according to claim 23, wherein a value of the periodicity $T_{RA}$ is one or more of the following: 10 ms, 20 ms, 40 ms, 80 ms, or 160 ms.

28. The apparatus according to claim 23, wherein a system frame number (SFN) where a start location of the random access resources associated with the plurality of downlink signals is located is system frame number 0.

29. The apparatus according to claim 23, wherein the random access configuration information further includes at least one piece of the following information: an association relationship between the plurality of downlink signals and the random access resources, or a quantity of random access resources associated with each downlink signal group.

30. The apparatus according to claim 23, wherein the configuration information is sent using system information.

31. The method according to claim 1, wherein a value of the periodicity $T_{RA}$ is one or more of the following: 10 ms, 20 ms, 40 ms, 80 ms, or 160 ms.

* * * * *

UNITED STATES PATENT AND TRADEMARK OFFICE
CERTIFICATE OF CORRECTION

| | | |
|---|---|---|
| PATENT NO. | : 12,438,656 B2 | Page 1 of 1 |
| APPLICATION NO. | : 17/675676 | |
| DATED | : October 7, 2025 | |
| INVENTOR(S) | : Yan et al. | |

It is certified that error appears in the above-identified patent and that said Letters Patent is hereby corrected as shown below:

In the Claims

In Column 25, in Claim 6, Line 18, delete "of the of" and insert -- of --.

In Column 27, in Claim 23, Lines 23-25, delete "a length of a time period ($T_{RA}$) periodicity of $T_{RA}$ for mapping the plurality of downlink signals onto the random access resources," and insert -- a periodicity of $T_{RA}$, --.

In Column 28, in Claim 25, Line 7, delete "the a" and insert -- the --.

Signed and Sealed this
Eighteenth Day of November, 2025

John A. Squires
*Director of the United States Patent and Trademark Office*